United States Patent
Hulaud et al.

(10) Patent No.: US 12,207,014 B2
(45) Date of Patent: Jan. 21, 2025

(54) CLOUD-BASED APPLICATION OF VISUAL EFFECTS TO VIDEO

(71) Applicant: Google LLC, Mountain View, CA (US)

(72) Inventors: Stéphane Hervé Loïc Hulaud, Stockholm (SE); Peter Tore Fredrik Solenberg, Stockholm (SE); Karl Mikael Nilsson, Nacka (SE); Måns Erik KLasson Vestin, Stockholm (SE)

(73) Assignee: GOOGLE LLC, Mountain View, CA (US)

( * ) Notice: Subject to any disclaimer, the term of this patent is extended or adjusted under 35 U.S.C. 154(b) by 14 days.

(21) Appl. No.: 17/738,176

(22) Filed: May 6, 2022

(65) Prior Publication Data
US 2023/0362321 A1     Nov. 9, 2023

(51) Int. Cl.
*H04N 5/272* (2006.01)
*G06T 5/70* (2024.01)
*H04N 23/74* (2023.01)

(52) U.S. Cl.
CPC ............... *H04N 5/272* (2013.01); *G06T 5/70* (2024.01); *H04N 23/74* (2023.01)

(58) Field of Classification Search
USPC .................................................. 386/278, 248
See application file for complete search history.

(56) References Cited

U.S. PATENT DOCUMENTS

| | | | | |
|---|---|---|---|---|
| 9,357,165 B2 * | 5/2016 | Lu | ............................ | G06T 11/60 |
| 9,881,359 B2 * | 1/2018 | Liu | .......................... | H04N 7/15 |
| 2008/0028092 A1 * | 1/2008 | Shen | ....................... | H04N 7/147 |
| | | | | 348/E7.081 |
| 2014/0362163 A1 | 12/2014 | Winterstein et al. | | |
| 2015/0138307 A1 * | 5/2015 | Karimi-Cherkandi | ....................... | |
| | | | | H04N 17/004 |
| | | | | 348/14.12 |
| 2015/0229882 A1 | 8/2015 | Liu | | |
| 2019/0200049 A1 * | 6/2019 | Yang | .................. | H04N 21/2343 |
| 2020/0186649 A1 * | 6/2020 | Zheng | .................. | H04M 3/567 |
| 2020/0234696 A1 * | 7/2020 | Vashisht | ................. | G10L 15/24 |
| 2020/0235860 A1 * | 7/2020 | Wu | .......................... | H04N 7/15 |
| 2022/0174098 A1 * | 6/2022 | Han | ........................ | H04N 7/147 |
| 2022/0334706 A1 * | 10/2022 | Guo | ....................... | G06T 19/006 |
| 2022/0394077 A1 * | 12/2022 | Han | ...................... | H04L 65/765 |
| 2023/0126108 A1 * | 4/2023 | Roper | ....................... | G06T 7/90 |
| | | | | 348/14.08 |

(Continued)

OTHER PUBLICATIONS

International Search Report and Written Opinion for Application No. PCT/US2023/020527, mailed Aug. 18, 2023, 14 pages.

(Continued)

*Primary Examiner* — Nigar Chowdhury
(74) *Attorney, Agent, or Firm* — DORITY & MANNING P.A.

(57) ABSTRACT

A server system receives, from a first client device, a video stream relating to a videoconferencing session and receives, from the first client device, visual effects information relating to one or more visual effects to be applied to the video stream. The server system applies, based on the received visual effects information, the one or more visual effects to the video stream to generate one or more modified video streams, and transmits the one or more modified video streams to one or more other client devices participating in the videoconferencing session.

20 Claims, 10 Drawing Sheets

(56) References Cited

U.S. PATENT DOCUMENTS

| | | | |
|---|---|---|---|
| 2023/0132407 A1* | 5/2023 | Lang .................... | H04N 7/147 348/580 |
| 2023/0262317 A1* | 8/2023 | O'Leary ............... | H04N 5/272 348/14.03 |
| 2023/0308603 A1* | 9/2023 | Nicholson ............. | H04N 7/152 345/632 |

OTHER PUBLICATIONS

International Preliminary Report on Patentability for Application No. PCT/US2023/020527, mailed Nov. 21, 2024, 9 pages.

* cited by examiner

CLOUD-BASED APPLICATION OF VISUAL EFFECTS TO VIDEO

FIELD

The disclosure relates to video processing for videotelephony (which may also be referred to as a video call or a videoconference) conducted over a network. More particularly, embodiments disclosed herein relate to video processing operations for a videoconference being performed in the cloud by one or more servers instead of being performed by a client device.

BACKGROUND

Videotelephony includes a system of telecommunications in which computing devices are employed in the transmission of audio and visual signals, allowing two or more people to participate in a real-time conversation from different locations.

Some videotelephony applications support various visual effects, such as blurred backgrounds and adjusted lighting. However, not all client devices (e.g., laptops, tablets, smartphones, etc.) are powerful enough to render these visual effects without degradation in the performance of the client device and/or of the videoconferencing application.

SUMMARY

Aspects and advantages of embodiments of the disclosure will be set forth in part in the following description, or can be learned from the description, or can be learned through practice of the example embodiments.

In one or more example embodiments, a server system (e.g., a video processing server), includes one or more memories configured to store instructions, and one or more processors configured to execute the instructions stored in the one or more memories to: receive, from a first client device, a video stream relating to a videoconferencing session, receive, from the first client device, visual effects information relating to one or more visual effects to be applied to the video stream, apply, based on the received visual effects information, the one or more visual effects to the video stream to generate one or more modified video streams, and transmit the one or more modified video streams to one or more other client devices participating in the videoconferencing session.

In some implementations, the one or more processors of the server system are configured to transmit one of the one or more modified video streams to the first client device.

In some implementations, the one or more processors of the server system are configured to, in response to a media quality of the modified video stream transmitted to the first client device being less than a threshold level and/or a latency of the modified video stream transmitted to the first client device being greater than a threshold level, transmit a notification to the first client device indicating that the first client device is to assume control for applying the one or more visual effects to the video stream and/or to stop transmission of the one or more modified video streams to the one or more other client devices participating in the videoconferencing session.

In some implementations, the one or more processors of the server system are configured to: generate a plurality of modified video streams based on the received visual effects information, wherein each of the plurality of modified video streams have a different resolution, and transmit one of the plurality of modified video streams to a respective client device among the one or more other client devices participating in the videoconferencing session based on a data transfer rate between the server system and the respective client device.

In some implementations, the visual effects information includes information relating to one or more settings for the one or more visual effects to be applied to the video stream. In some implementations, the one or more settings include a blur radius for a background blur effect to be applied to at least a portion of the video stream. In some implementations, the one or more settings include a brightness level for a lighting effect to be applied to at least a portion of the video stream.

In some implementations, the video stream transmitted from the first client device is a self-view of a user of the first client device. In some implementations, in response to the self-view of the user being changed to a size greater than a threshold level, the one or more processors of the server system are configured to: stop applying the one or more visual effects to the video stream, and transmit a notification to the first client device indicating that the first client device is to assume control for applying the one or more visual effects to the video stream and/or to stop transmission of the one or more modified video streams to the one or more other client devices participating in the videoconferencing session.

In one or more example embodiments, a computing device (e.g., a client device), includes one or more memories configured to store instructions, and one or more processors configured to execute the instructions stored in the one or more memories to: determine whether to process video relating to a videoconferencing session in a first mode or a second mode, in response to determining to process the video in the first mode, generate a first video stream and transmit, to a server system, the first video stream and transmit, to the server system, visual effects information relating to one or more visual effects to be applied to the first video stream, and in response to determining to process the video in the second mode, generate a second video stream by applying the one or more visual effects to the first video stream and transmit, to the server system or a separate server system, the second video stream.

In some implementations, the one or more processors of the computing device are configured to receive, from the server system, a modified video stream in which the one or more visual effects has been applied to the first video stream based on the visual effects information transmitted to the server system.

In some implementations, the one or more processors of the computing device are configured to, in response to a media quality of the modified video stream being less than a threshold level and/or a latency of the modified video stream received from the server system being greater than a threshold level, determine to process the video in the second mode and/or stop transmission of the first video stream to the server system.

In some implementations, the visual effects information includes information relating to one or more settings for a visual effect to be applied to the first video stream. In some implementations the one or more settings include a blur radius for a background blur effect to be applied to at least a portion of the first video stream. In some implementations the one or more settings include a brightness level for a lighting effect to be applied to at least a portion of the first video stream.

In some implementations the video includes a self-view of a user of the computing device, and the one or more processors of the computing device are configured to determine whether to process the video in the first mode or the second mode based on a size of the self-view. In some implementations when the size of the self-view is less than a threshold level, the one or more processors of the computing device are configured to determine to process the video in the first mode, and when the size of the self-view is greater than the threshold level, the one or more processors of the computing device are configured to determine to process the video in the second mode.

In some implementations the video includes a plurality of self-views of a user of the computing device, the one or more processors of the computing device are configured to determine a self-view among the plurality of self-views having a largest size, and the one or more processors of the computing device are configured to determine whether to process the video in the first mode or the second mode based on a size of the self-view having the largest size.

In some implementations the visual effects information includes instructions for the server system to not transmit the first video stream to other client devices participating in the videoconferencing session if the one or more visual effects cannot be applied to the first video stream.

In one or more example embodiments, a computer implemented method for a computing device (e.g., client device) includes determining whether to process video relating to a videoconferencing session in a first mode or a second mode, in response to determining to process the video in the first mode, generating a first video stream and transmitting, to a server system, the first video stream and transmitting, to the server system, visual effects information relating to one or more visual effects to be applied to the first video stream, and in response to determining to process the video in the second mode, generating a second video stream by applying the one or more visual effects to the first video stream and transmitting, to the server system or a separate server system, the second video stream.

In one or more example embodiments, a computer implemented method for a server system (e.g., a video processing server) includes receiving from a first client device a video stream relating to a videoconferencing session, receiving from the first client device visual effects information relating to one or more visual effects to be applied to the video stream, applying the one or more visual effects to the video stream to generate one or more modified video streams based on the received visual effects information, and transmitting the one or more modified video streams to one or more other client devices participating the videoconferencing session.

In one or more example embodiments, a computer-readable medium (e.g., a non-transitory computer-readable medium) which stores instructions that are executable by one or more processors of a client device and/or a server system is provided. In some implementations the computer-readable medium stores instructions which may include instructions to cause the one or more processors to perform one or more operations of any of the methods described herein (e.g., operations of the server system and/or operations of the client device). The computer-readable medium may store additional instructions to execute other aspects of the server system and client device and corresponding methods of operation, as described herein.

These and other features, aspects, and advantages of various embodiments of the disclosure will become better understood with reference to the following description, drawings, and appended claims. The accompanying drawings, which are incorporated in and constitute a part of this specification, illustrate example embodiments of the disclosure and, together with the description, serve to explain the related principles.

BRIEF DESCRIPTION OF THE DRAWINGS

Detailed discussion of example embodiments directed to one of ordinary skill in the art is set forth in the specification, which makes reference to the appended drawings, in which.

DETAILED DESCRIPTION

Figure 1:
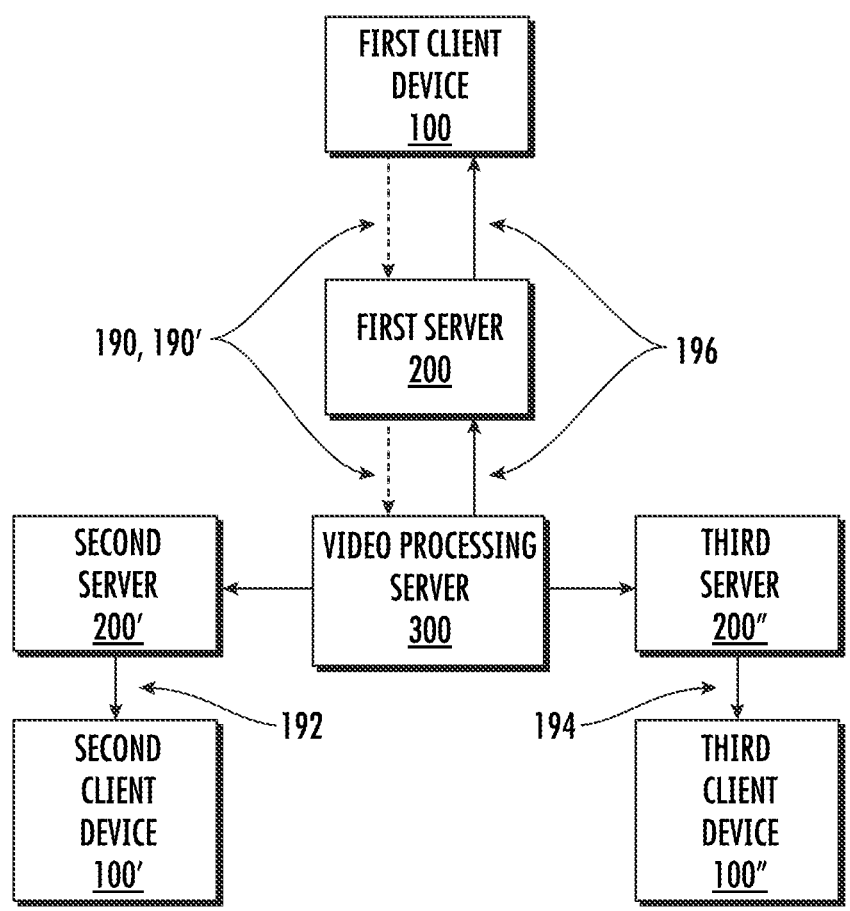
FIG. 1 depicts an example videoconferencing system according to one or more example embodiments of the disclosure.

Reference now will be made to embodiments of the disclosure, one or more examples of which are illustrated in the drawings, wherein like reference characters denote like elements. Each example is provided by way of explanation of the disclosure and is not intended to limit the disclosure. In fact, it will be apparent to those skilled in the art that various modifications and variations can be made to disclosure without departing from the scope or spirit of the disclosure. For instance, features illustrated or described as part of one embodiment can be used with another embodiment to yield a still further embodiment. Thus, it is intended that the disclosure covers such modifications and variations as come within the scope of the appended claims and their equivalents.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

It will be understood that when an element is referred to as being "connected" to another element, the expression encompasses an example of a direct connection or direct coupling, as well as a connection or coupling with one or more other elements interposed therebetween.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

According to example embodiments, aspects of video processing for a videoconference may be performed in the cloud by one or more servers instead of by a client device, thereby relieving the client device of processing tasks (e.g., central processing unit/graphics processing unit (CPU/GPU) tasks) which can cause the client device to overheat, have a poor display quality, or otherwise perform poorly. According to example embodiments, the one or more servers receive, from a client device, a video stream relating to a videoconferencing session. The one or more servers also receive, from the client device, visual effects information relating to one or more visual effects to be applied to the video stream. The one or more servers apply the one or more visual effects to the video stream to generate one or more modified video streams based on the received visual effects information, and transmit the one or more modified video streams to one or more other client devices participating in the videoconferencing session.

According to examples of the disclosure, a video stream is obtained from a client device and media features corresponding to visual effects which are to be added to the video stream, are processed in the cloud by one or more servers, which are referred to hereinafter as a video processing server. A video processing server is a server (or a combination of servers) which is configured to receive a video stream from the client device (possibly via an intermediary server) and to transmit the video stream (possibly in a modified form) to one or more other client devices. The video processing server may modify the video stream by adding one or more visual effects to the video stream in an example embodiment, based on information received from the client device regarding the one or more visual effects to be applied to the video stream. The video processing server may also change a resolution of the modified or non-modified video stream based on the requirements of a respective client device which is to receive the modified or non-modified video stream. Thus, the video processing server has as an input from the client device a video stream and has a plurality of outputs corresponding to a plurality of modified or non-modified video streams with different resolutions according to the requirements of the respective receiving client devices. In example embodiments, when the video stream is modified by the video processing server the modified video stream is transmitted to the client device which transmitted the video stream to the cloud in addition to also being transmitted to the other client devices participating in the videoconference. Therefore, the user of the client device is also able to view the modified video stream having the visual effects applied to the video stream, during the videoconference.

According to example embodiments, the client device determines whether to process video relating to a videoconferencing session in a first mode or a second mode. In response to determining to process the video in the first mode, the client device generates a first video stream and transmits, to a server, the first video stream and transmits, to the server, visual effects information relating to a visual effect to be applied to the first video stream. In response to determining to process the video in the second mode, the client device generates a second video stream by applying the visual effect to the first video stream and transmits, to the server (or another server), the second video stream. For example, in the first mode the client device transmits a raw video stream without visual effects to the server and additionally transmits visual effects information relating to a visual effect to be applied to the first video stream. For example, the visual effect may be a blurring effect which is to be applied to a background of a self-view video stream. The server receives the raw video stream and, based on the visual effects information, applies the blurring effect to the background of the self-view video stream to generate the modified video stream. The server transmits the modified video stream to other client devices participating in the videoconferencing session and in some cases additionally transmits the modified video stream to the client device which transmitted the raw video stream to the server.

According to embodiments disclosed herein, visual effects may be applied to a video stream by one or more servers which, as mentioned above, are referred to as a video processing server. For example, the video processing server may receive compressed media (e.g., video) from the client device, decompress the media, and apply the visual effects to the uncompressed media. To implement the visual effects to the video stream, the video processing server may utilize a library which supports combining visual rendering effects (e.g., blurring, scaling, lighting, etc.) with the execution of foreground segmentation (e.g., in a self-view of the user of the client device, segmenting out the user and applying the visual effects to the background). The video processing server may be specially configured to perform video processing with respect to the video stream received from the client device so as to apply the visual effects to the video stream. For example, the video processing server may include one or more CPUs, a plurality of GPUs (e.g., to perform segmentation operations and/or to apply the visual effects to the video stream), and a plurality of video encoder accelerators (e.g., application-specific integrated circuits (ASICs) to perform transcoding operations such as encoding, decoding, and resizing).

According to embodiments disclosed herein, so that the user of the client device can view the visual effects as applied to the video stream, a loopback stream from the video processing server to the client device is implemented. In example embodiments, one or more intermediary servers may be disposed between the client device and the video processing server, such that the one or more intermediary servers route the video stream from the client device to the video processing server, and the one or more intermediary servers route the modified video stream from the video processing server to the client device.

The video processing server is configured to perform video transcoding operations. For example, the video processing server may receive compressed media (e.g., video) from the client device, decompress the media, and apply the visual effects to the uncompressed media. To implement the visual effects to the video stream, the video processing server may utilize a library which supports combining visual rendering effects (e.g., blurring, scaling, lighting, etc.) with the execution of foreground segmentation (e.g., in a self-view of the user of the client device, segmenting out the user and applying the visual effects to the background).

For example, when the client device applies the visual effects to the video stream itself, the video processing server may be bypassed and other servers in the computing network (server system) may be utilized to transmit the video stream to client devices participating in the videoconferencing session. In another example embodiment, when the video processing server is not requested or needed to apply visual effects to the incoming video stream, the video processing server is configured to decode the video stream received from the client device and to pass on the decoded video stream to a plurality of resizer nodes, one for each unique resolution requested by a respective client device which is to receive the video stream for the videoconferencing session. That is, the video processing server is configured to perform video transcoding operations using a graph of nodes. In some implementations in which visual effects are not to be applied by the video processing server, a client device which requests a video stream having a highest resolution may receive the video stream from the client device via another server without the video stream passing through the video processing server as a resizing operation need not be performed by the video processing server. According to another example, the video processing server is configured to pass on the decoded video stream to the plurality of resizer nodes, where each of the resizer nodes is bucketized to correspond to a resolution for a particular bit rate of a respective client device participating in the videoconferencing session, which may or may not correspond exactly to a resolution of that respective client device. For example, the respective client device may have a capability to process a high-definition (HD) video stream (e.g., 1920×1080), but due to bit rate and/or bandwidth constraints may be limited to a particular resolution (e.g., 800×600), and thus the video processing server may resize the modified video stream according to the particular resolution based on the bit rate of the respective client device.

According to example embodiments disclosed herein, the client device is configured to request that the video processing server apply one or more visual effects to a video stream which is generated by the client device and transmitted to the video processing server (e.g., via an intermediary server). The client device may be configured to signal to the video processing server to apply the visual effects to the video stream, for example, in a configuration property associated with the video stream (e.g., via metadata). The configuration property may include one or more settings for one or more visual effects which are to be applied to the video stream by the video processing server. When the client device requests the video processing server to apply a visual effect to the video stream, the video processing server is configured to decode the video stream received from the client device and to pass on the decoded video stream to a visual effects applier (also referred to as a media pipe effects module) to apply the visual effect to the video stream to generate a modified video stream. The modified video stream is then passed on to the plurality of resizer nodes, one for each unique resolution requested by a respective client device which is to receive the modified video stream. According to another example, the video processing server is configured to pass on the modified video stream to the plurality of resizer nodes, where each of the resizer nodes is bucketized to correspond to a resolution for a particular bit rate of a respective client device participating in the videoconferencing session, which may or may not correspond exactly to a resolution of that respective client device.

According to example embodiments disclosed herein, the client device may be configured to receive the modified video stream from the video processing server. The client device may specifically request that the video processing server transmit back the modified video stream to the client device, or the video processing server may be configured to automatically transmit back the modified video stream to the client device. For example, when a visual effect is requested by the client device, the video processing server is configured to signal (e.g., via a message or via metadata) to an intermediary server (i.e., a server disposed between the client device and the video processing server and which forwards the video stream received from the client device to the video processing server) that the video stream received from the client device will also be used at least in part for a transmission from the video processing server to the client device via the intermediary server. Accordingly, in response to receiving the signal from the video processing server, the intermediary server prepares for sending at least a part of the video stream back to the client device, and a push notification is sent to the client device to notify the client device about the new stream. When the client device receives the notification about the modified stream, the client device is configured to perform a search of the incoming data from the intermediary server which includes the modified video stream. The client device may be configured to display the modified video stream preferentially over the local stream generated at the client device.

According to example embodiments disclosed herein, the client device may be configured to toggle or switch between a first mode in which the client device requests that the video processing server apply visual effects to the video stream generated at the client device, and a second mode in which the client device applies the visual effects to the video stream and transmits the modified video stream to the video processing server. For example, if the user of the client device switches to the first mode in which a background blur is to be applied to the video stream by the video processing server while a background replace visual effect is applied to the video stream, one or more processors of the client device may be configured to first enable the first mode so that the background blur is applied to the video stream by the video processing server while temporarily still allowing the background replace visual effect to be applied temporarily until the background replace visual effect is disabled. Thus, a few frames of the video stream may contain both visual effects, however such an approach ensures no unprocessed frames will be forward to other client devices participating in the videoconferencing session.

According to example embodiments disclosed herein, the client device may be configured to distinguish between a "green room" or "waiting room" state in which a user waits to be admitted or join a meeting in the videoconference and a "joined" state where the user has been admitted or joined the meeting, when switching between the first and second modes. For example, in response to the client device moving from a waiting room to a joined state, the one or more processors of the client device may be configured to switch from the second mode to the first mode so that the video processing server assumes responsibility for modifying the video stream generated by the client device with the visual effect. For example, a background blur effect (or other visual effect) which is applied by the client device to the video stream while the client device waits in a waiting room to be admitted to a meeting "moves" from the client to the video processing server upon the client device being admitted to the meeting. Thus, when the client device joins the meeting the video processing server assumes responsibility for applying the background blur effect (or other visual effect).

According to example embodiments disclosed herein, the videoconferencing application may have a default setting for the first mode. That is, the videoconferencing application may prefer as a default that the video processing server apply the visual effects in the first mode during a videoconferencing session (instead of the client device in the second mode). In response to the video processing server not being available (e.g., due to a resource outage, high peak usage, bandwidth limitations, etc.), the one or more processors of the client device may be configured to switch to the second mode by which processing of the visual effects is applied by the client device. For example, in response to the video processing server running out of graphic computing resources, the intermediary server is configured to signal back to the client device (e.g., via a message or via metadata) that that the first mode (i.e., where visual effects are applied by the video processing server rather than the client device) has become unavailable, and the client device will fall back to the second mode in which the client device applies the visual effects (i.e., client-side effects). In an example embodiment, if the client device is unable to support the visual effects which were requested to be applied to the video stream, the one or more processors of the client device may be configured to control the display of the client device to display a message indicating that the requested visual effects could not be applied to the video stream, and the camera of the client device will be muted to protect user privacy. The client device may notify the user that the requested visual effects could not be applied to the video stream by additional or alternative methods (e.g., via a speaker).

In an example embodiment, if the client device requests the video processing server to apply visual effects to the video stream and the video processing server is unable to modify the video stream (e.g., due to a resource outage or processing limitation), the video processing server may be configured to forward the video stream to other client devices in the videoconferencing session without applying the visual effects. However, in an example embodiment the video processing server may also be configured to not forward the video stream to other client devices in the videoconferencing session if the video processing server is unable to modify the video stream (e.g., due to a resource outage or processing limitation). The video processing server may receive instructions from the client device not to forward the video stream to other client devices in the videoconferencing session in the event the video processing server is unable to modify the video stream as requested. This aspect provides the user of the client device with additional privacy in cases that the requested visual effect is privacy-related (e.g., a user may not wish to have other users in the videoconferencing session see an un-blurred background). Thus, remote client devices in the videoconferencing session may receive a modified video stream or no video at all during intermittent failures.

According to example embodiments disclosed herein, the client device may be configured to display a self-view of the user of the client device during the videoconferencing session. For example, when the client device operates in the first mode and requests that the video processing server apply visual effects to the video stream, the client device may be configured to receive—remotely—the modified video stream. The remotely received modified video stream may have worse quality and latency than a local self-view that is generated by the client device because of the network round trip and transcoding which takes place at the video processing server. However, according to example embodiments disclosed herein, the quality and latency of the self-view may be improved according to various techniques. Thus, the media quality and latency of the self-view may be kept at a level where the user's perception of the quality of the videoconferencing session is not negatively affected. For example, to obtain a lower latency (e.g., a threshold less than one second, a threshold less than 300 mms, etc.), the video processing server may be configured to enable WebRTC low-latency rendering and set a threshold limit for the latency when sending the modified video stream back to the client device (e.g., by setting the threshold limit in a PlayoutDelayLimits RTP header extension). As an additional, or alternative, approach to improve self-view quality, the video processing server may be configured to adjust a bitrate allocation strategy so as to prioritize the modified video stream to be sent back to the client device relative to sending modified video streams to other client devices. That is, the video processing server may be configured to prioritize the looped-back modified video stream when distributing available bandwidth to the downstreams. Without this prioritization, a user of the client device may lose their self-view in larger meetings when not speaking, while others in the videoconferencing session may still view the user. As an additional, or alternative, approach to improve self-view quality, the one or more processors of the client device may be configured to reduce the framerate for remotely received video streams (e.g., video streams transmitted from other client devices in the videoconferencing session) as a performance adaptation, where the self-view modified video stream is excluded (i.e., kept at a default framerate). If there still is not enough bandwidth for the looped-back modified video stream, in spite of one or more of the above-described techniques being implemented (e.g., by increasing a priority of the modified video stream to be sent back to the client device), the one or more processors of the client device may be configured to detect that the video processing server and/or intermediary server are unable to modify the video stream generated by the client device with visual effects, and the client device may switch from processing the video in the first mode to processing the video in the second mode where the client device modifies the video stream by applying visual effects to the video stream.

According to example embodiments disclosed herein, the client device may be configured to toggle or switch between the first mode in which the client device requests that the video processing server apply visual effects to the video stream generated at the client device, and the second mode in which the client device applies the visual effects to the video stream and transmits the modified video stream to the video processing server, based on a size of the self-view and/or the physical resolution of the display of the client device. The size of the self-view may correspond to an active resolution of the self-view. For example, during a videoconferencing session when the size of the self-view displayed on the display of the client device is greater than a threshold value, one or more processors of the client device are configured to switch to (or maintain) the second mode in which the client device applies the visual effects to the video stream and transmits the modified video stream to the video processing server. When the size of the self-view is greater than the threshold value, video quality issues may arise at the client device which are perceptible to the user. Conversely, when the size of the self-view displayed on the display of the client device is less than the threshold value, the one or more processors of the client device are configured to switch to (or maintain) the first mode in which the client device requests that the video processing server apply visual effects to the video stream generated at the client device.

In an embodiment, during a videoconferencing session when a plurality of self-views are displayed on the display of the client device, the one or more processors of the client device are configured to determine the self-view having the largest size. The one or more processors of the client device are configured to determine whether the size of the self-view having the largest size is greater than the threshold value to determine whether to switch to (or maintain) the second mode in which the client device applies the visual effects to the video stream and transmits the modified video stream to the video processing server. The size of the self-view may correspond to an active resolution of the self-view having the largest size. The one or more processors may be configured to track or monitor a size of the one or more self-views during a videoconferencing session to determine whether a maximum size changes and whether to switch to (or maintain) the second mode in which the client device applies the visual effects to the video stream and transmits the modified video stream to the video processing server. Changes to the size and/or location of the self-view may be transmitted to the video processing server in order to update the location of visual effects which are applied to the self-view, according to whether the client device is switched to the first mode or second mode. In an example, when the size of the self-view is changed frequently by a user, the one or more processors may be configured to wait until the resizing has stopped for a predetermined amount of time (e.g., three seconds), before determining whether the size of the self-view displayed on the display of the client device is greater than the threshold value.

When the client toggles or switches between the first mode in which the client device requests that the video processing server apply visual effects to the video stream generated at the client device, and the second mode in which the client device applies the visual effects to the video stream and transmits the modified video stream to the video processing server, intermittent video issues (freezing of video, frame drops, etc.) may occur. Such intermittent video issues may be more apparent in the self-view than by remote participants of the videoconferencing session. In an example embodiment, when switching from one implementation to another (i.e., the first mode to the second mode or vice versa), the client device is configured to wait until the new implementation has started (i.e., the client device starts receiving remote frames for the self-view generated by the video processing server, or the visual effects are applied by the client device) before shutting down the previous implementation.

For example, when switching from the second mode to the first mode, the one or more processors of the client device may be configured to keep displaying the self-view via a local stream until a first keyframe of the remote modified video stream has been received from the video processing server. This approach may result in no freezing and a minimal amount of frames with effects doubly applied (e.g., double-blur due to visual effects being applied by both the client device and video processing server). If the video stream is not already being resized for multiple resolutions, remote views at other client devices in the videoconferencing session may freeze when visual effects are requested from the video processing server and unfreeze once the first keyframe from the client device through the video processing server has been propagated. Since the client device won't stop applying visual effects until it has seen the new modified video stream, there will be some frames with effects doubly applied. Both the client device and remote client devices participating in the videoconferencing session may see a quality drop due to the video stream being restarted.

For example, when switching from the first mode to the second mode, the one or more processors of the client device may be configured to display the self-view using the local stream immediately once visual effects are applied by the client, hiding any artifacts. Remote views at other client devices in the videoconferencing session may display some frames with effects doubly applied (e.g., double-blur) until the disabling of the visual effects by the video processing server takes effect and some stalling/frame drops when the client device is loading the visual effects.

In some implementations, to reduce a freeze time and/or reduce or avoid frames with double-effects, other configurations at the client device and/or video processing server may be implemented. For example, the video processing server may be kept in a state (e.g., a ready state) that is ready for applying visual effects to the video stream transmitted from the client device, but does not actually apply any visual effects until the mode is switched to the first mode. Keeping the video processing server in the state ready for applying visual effects reduces a startup time for the video processing server and reduces a freeze time for remote client devices in the videoconferencing session. In an embodiment the client device may be configured to send a timestamp/frame counter to the video processing server indicating a time in the future when the client device wants to switch modes. The video processing server is configured to ensure that the visual effect is enabled/disabled from that frame at the appropriate time. The client device is configured to wait until the timestamp/frame counter value before starting/stopping the application of the visual effect, preventing double-effect frames. The video processing server may be configured to immediately switch modes and/or may be kept in the ready state according to this embodiment in which the client device sends the timestamp/frame counter.

In an embodiment the client device may be configured to send metadata on the frames of the video stream which provide information to the video processing server about the visual effects. When the client device requests the video processing server to apply the visual effects, the video processing server is configured to generate the modified video stream having the visual effects only if the applied visual effects are different from any visual effects which are applied to the incoming video stream. The video processing server may be configured to immediately switch modes and/or may be kept in the ready state according to this embodiment in which the client device sends metadata on the frames of the video stream which provide information to the video processing server about the visual effects.

For example, in some implementations the client device and/or video processing server may pre-load a visual effect without actually applying the visual effect to the output stream. When switching from the first mode to the second mode, for example, the client device may be configured to pre-load a visual effect, request the video processing server to freeze at a current frame having visual effects which have been applied by the video processing server, send the video stream having visual effects applied by the client device, and then request the video processing server to stop applying visual effects to the video stream. Thus, instead of frames with double-effects, a short video freeze is applied. When switching from the second mode to the first mode, for example, the video processing server may be configured to pre-load a visual effect and receive a request from the client device to freeze a frame having visual effects applied by the client device. The client device may stop applying visual effects to the video stream and send a video stream without visual effects to the video processing server. The video processing server is then requested to apply visual effects to the video stream. Thus, instead of frames with double-effects, a short video freeze is applied.

In an example embodiment, a mixed mode of operation may be implemented between the client device and the video processing server. For example, when switching to have the client device apply the visual effects to the video stream, the one or more processors of the client device may be configured to display the self-view with the video stream having the visual effects applied to the video stream by client device, while sending the unmodified video stream to the video processing server such that the video processing server continues to apply visual effects to the unmodified video stream and the modified video stream (with visual effects applied by the video processing server) is sent for display at remote client devices participating in the videoconferencing session. This approach completely hides the switch from the first mode for remote client devices, while for the self-view at the client device there may be a temporary glitch when switching to the mixed mode due to the different timelines of the video streams. In an implementation, to avoid running in mixed-mode for a long period of time, the client device may be configured to switch from the mixed-mode to the second mode after a certain predetermined period of time. This approach prevents the wasting of cloud resources once the self-view has settled on a size that is below a threshold value such that the client device can apply visual effects without a degradation of the self-view being too great.

In another example embodiment, a view request for a self-view may be limited to a threshold resolution (e.g., 640×360) to make the switch from the second mode to the first mode on the self-view faster.

In another example embodiment, switching to the first mode may be disabled when any zooming feature (e.g., an autozoom or centering feature) is enabled in the videoconferencing application at the client device. However, in an embodiment the video processing server may be configured to apply visual effects to the video stream in the first mode when a zoom feature is enabled in the videoconferencing application at the client device. For example, a zoomed stream (i.e., the raw video stream which is modified at the client by zooming) may be sent from the client device to the video processing server, and visual effects may be applied to the zoomed stream. For example, the raw video stream may be sent from the client device to the video processing server, and the video processing server may apply both zooming and visual effects to the video stream.

The disclosure provides numerous technical effects and benefits. Video processing is an expensive processing task (e.g., CPU/GPU heavy task) which can consume significant bandwidth for client devices such as a laptop, tablet, smartphone, etc. While executing a videoconferencing application, adding visual effects to a video stream may cause client devices to overheat, consume the battery, and/or the client devices struggle to implement the visual effects with high quality (e.g., the frames per second drop or the client device slows down). As one example technical effect and benefit, the systems and methods disclosed herein allow certain video processing to be offloaded to the cloud (e.g., to a server such as the video processing server), which releases pressure on the client device. Accordingly, providing a server such as the video processing server which is configured with hardware to modify the video stream transmitted by the client device to include visual effects requested by the client device enables the videoconference to be run smoothly at the client device with high quality and efficiency. The technical benefits include decreased client CPU usage, increased stability, increased bandwidth, better video quality (e.g., higher resolutions and/or framerate), and an improved user experience.

Referring now to the drawings, FIG. 1 is an example videoconferencing system according to one or more example embodiments of the disclosure. FIG. 1 illustrates an example of a videoconferencing system which includes a first client device 100, a second client device 100', a third client device 100", a first server (first intermediary server) 200, a second server (second intermediary server) 200', a third server (third intermediary server) 200", and a video processing server 300, each of which may be in communication with one another over a network. For example, the first client device 100, the second client device 100', and third client device 100" can include any of a personal computer, a smartphone, a laptop, a tablet computer, and the like. The network may include any type of communications network such as a local area network (LAN), wireless local area network (WLAN), wide area network (WAN), personal area network (PAN), virtual private network (VPN), or the like. For example, wireless communication between elements of the example embodiments may be performed via a wireless LAN, Wi-Fi, Bluetooth, ZigBee, Wi-Fi direct (WFD), ultra wideband (UWB), infrared data association (IrDA), Bluetooth low energy (BLE), near field communication (NFC), a radio frequency (RF) signal, and the like. For example, wired communication between elements of the example embodiments may be performed via a pair cable, a coaxial cable, an optical fiber cable, an Ethernet cable, and the like.

As will be explained in more detail below, in some implementations the first client device 100 and one or more other client devices (e.g., the second client device 100', third client device 100", etc.) may participate in a videotelephony (hereinafter referred to as videoconferencing) session using video processing server 300 over the network. The videoconferencing session may include a plurality of client devices, including client devices other than the first client device 100, second client device 100', and third client device 100" shown in FIG. 1.

In FIG. 1, the first client device 100 transmits a video stream 190 (e.g., a raw video stream) to the video processing server 300 via first server 200. The video stream 190 may correspond to a self-view of a user of the first client device 100 which participates or is waiting to participate in a videoconferencing session with other client devices. In an example, the video stream 190 may be a raw video stream in which visual effects have not been applied to the video stream (e.g., a blurred background and/or lighting effects are not applied to the self-view of the user). In addition to the video stream 190, in an example the first client device 100 transmits to the video processing server 300 via first server 200, visual effects information 190' (e.g., media features) corresponding to visual effects which are to be applied to the video stream by the video processing server 300.

In response to receiving the video stream 190 and visual effects information 190', the video processing server 300 modifies the video stream 190 by adding one or more visual effects to the video stream 190, based on the visual effects information 190'. The video processing server 300 transmits the modified video stream to the other client devices participating in the videoconferencing session. For example, the video processing server 300 transmits the modified video stream 192 to second client device 100' via second server 200' and transmits the modified video stream 194 to third client device 100" via third server 200". In some implementations the video processing server 300 may transmit a modified video stream (loopback stream) 196 back to the first client device 100 via first server 200. In some implementations the modified video streams 192, 194, 196 may be the same (e.g., having a same resolution), while in other implementations the modified video streams 192, 194, 196 may be different from one another (e.g., having a different resolution). Further details regarding the operations of the video processing server 300 will be discussed below.

Figure 2A:
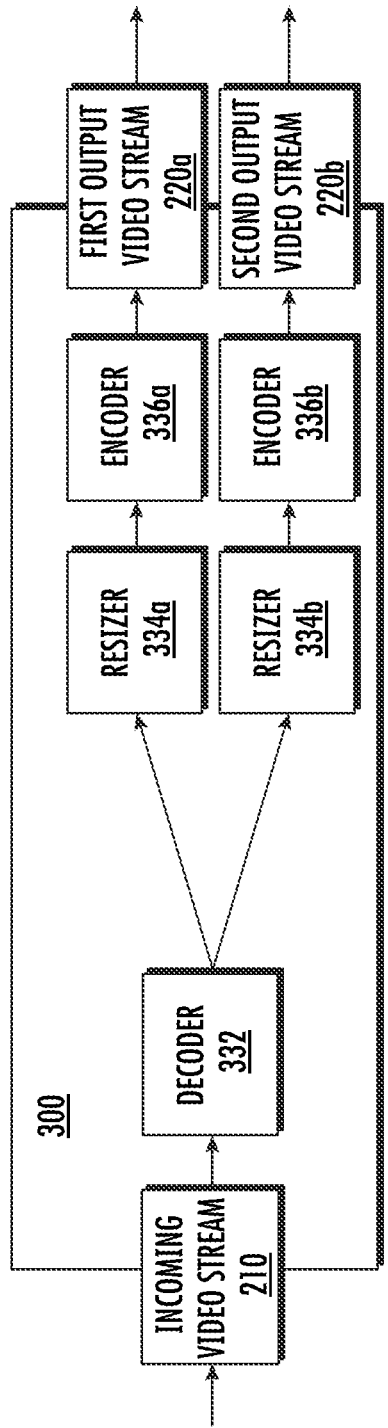
FIGS. 2A-2B depicts an example flow diagram for a video processing server according to one or more example embodiments of the disclosure.
Figure 2B:
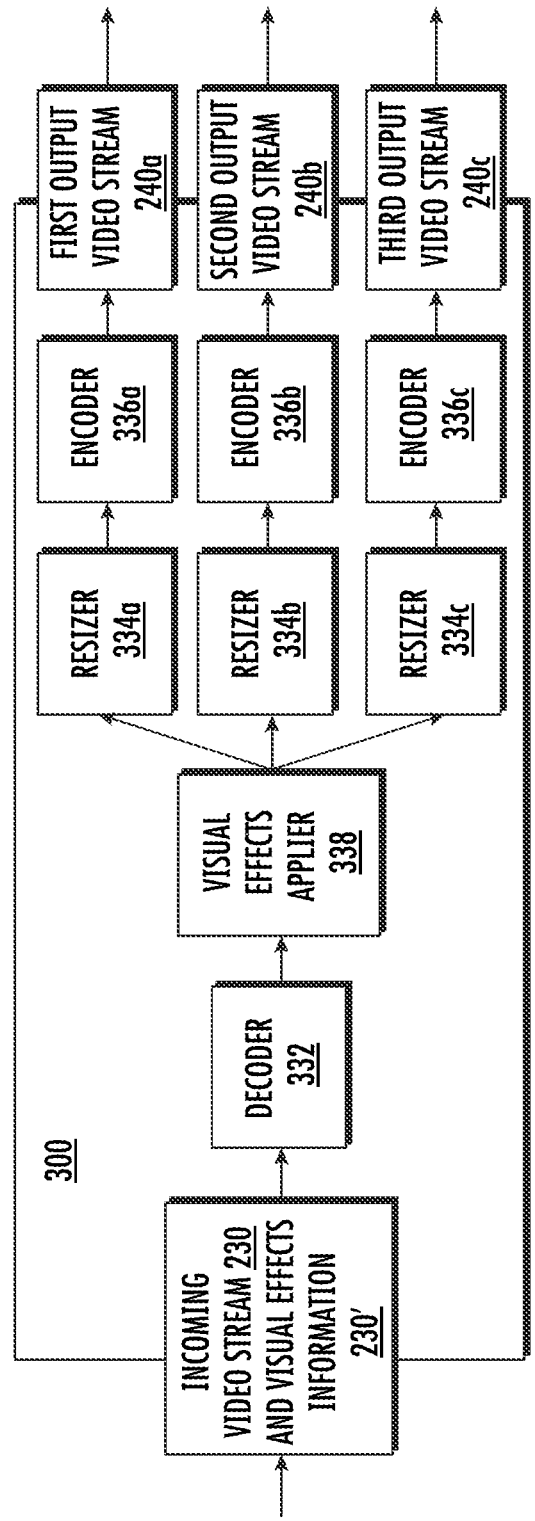

FIGS. 2A-2B depicts an example flow diagram for a video processing server according to one or more example embodiments of the disclosure. For example, when the first client device 100 applies the visual effects to the video stream itself, the video processing server 300 may be bypassed and other servers in the computing network (server system) may be utilized to transmit the video stream to client devices participating in the videoconferencing session. In another example embodiment, when the video processing server 300 is not requested or needed to apply visual effects to the incoming video stream, the video processing server 300 is configured to decode the video stream received from the first client device 100 and to pass on the decoded video stream to a plurality of resizer nodes (resizers), one for each unique resolution requested by a respective client device which is to receive the video stream for the videoconferencing session. That is, the video processing server 300 is configured to perform video transcoding operations using a graph of nodes. Transcoding refers to operations such as decompressing (e.g., decoding) a video stream, altering the decompressed video stream (e.g., applying one or more visual effects, resizing the video stream, etc.), and recompressing (e.g., encoding) the video stream. In implementations in which visual effects are not to be applied by the video processing server 300, a client device which requests a video stream having a highest resolution may receive the video stream from the client device via another server without the video stream passing through the video processing server 300 (as the resizing operation need not be performed by the video processing server 300). According to another example, the video processing server is configured to pass on the decoded video stream to the plurality of resizer nodes, where each of the resizer nodes is bucketized to correspond to a resolution for a particular bit rate of a respective client device participating in the videoconferencing session, which may or may not correspond exactly to a resolution of that respective client device. For example, the respective client device may have a capability to process a high-definition (HD) video stream (e.g., 1920×1080), but due to bit rate and/or bandwidth constraints may be limited to a particular resolution (e.g., 800×600, 640×360, etc.), and thus the video processing server 300 may resize the video stream according to the particular resolution based on the bit rate of the respective client device.

Referring to FIG. 2A, the video processing server 300 may be configured to process an incoming video stream 210 received from the first client device 100, where visual effects have been applied to the incoming video stream 210 at the client side (i.e., by the first client device 100). In the example of FIG. 2A, the video processing server 300 processes the incoming video stream 210 by a decoder 332 decoding the incoming video stream 210. The video processing server 300 is also configured to resize the decoded video stream by resizers 334a, 334b performing a resizing operation to obtain desired resolutions of the incoming video stream 210. As mentioned above, the desired resolutions may be based on a capability of a client device which is to receive the video stream from the video processing server 300 or based on existing bit rate and/or bandwidth constraints with respect to the client device which is to receive the video stream from the video processing server 300. For example, resizer 334a may be configured to resize the decoded video stream with a first resolution (e.g., 640×480) and resizer 334b may be configured to resize the decoded video stream with a second resolution (e.g., 320×240). Encoder 336a is configured to encode the video stream resized by resizer 334a to output a first output video stream 220a and encoder 336b is configured to encode the video stream resized by resizer 334b to output a second output video stream 220b. For example, the first output video stream 220a may be transmitted to second client device 100' via second server 200' and the second output video stream 220b may be transmitted to third client device 100" via third server 200".

Referring to FIG. 2B, the video processing server 300 is shown to include the visual effects applier 338. The visual effects applier 338 is also included in the embodiment of FIG. 2A, however is omitted for the sake of clarity. In the embodiment of FIG. 2A, the visual effects applier 338 may be bypassed or not perform any operation with respect to the video stream as the visual effects have already been applied by the first client device 100 and the video stream is simply passed on to the resizers 334a, 334b. In the embodiment of FIG. 2B, the video processing server 300 may be configured to process an incoming video stream 230 received from the first client device 100, where visual effects have not been applied to the incoming video stream 230 at the client side (i.e., by the first client device 100), and instead the visual effects applier 338 applies one or more visual effects to the incoming video stream 230 (i.e., at the cloud-side). In the example of FIG. 2B, the video processing server 300 processes the incoming video stream 230 by a decoder 332 decoding the incoming video stream 230. The visual effects applier 338 is configured to apply one or more visual effects to the decoded video stream according to visual effects information 230' which is also received from the first client device 100. The visual effects information 230' may include information relating to one or more settings for a visual effect to be applied to the incoming video stream 230. For example, the one or more settings may include a blur radius for a background blur effect to be applied to at least a portion of the incoming video stream 230. For example, the one or more settings may include a brightness level for a lighting effect to be applied to at least a portion of the incoming video stream 230. Similar to FIG. 2A, the video processing server 300 is configured to resize the decoded video stream (having the visual effects applied by the visual effects applier 338) by one or more resizers. In the example of FIG. 2B three resizers 334a, 334b, 334c are illustrated. Resizers 334a, 334b, 334c are configured to perform a resizing operation to obtain desired resolutions of the incoming video stream 230. The desired resolutions may be based on a capability of a client device which is to receive the video stream from the video processing server 300 or based on existing bit rate and/or bandwidth constraints with respect to the client device which is to receive the video stream from the video processing server 300. For example, resizer 334a may be configured to resize the decoded video stream with a first resolution (e.g., 640×480), resizer 334b may be configured to resize the decoded video stream with a second resolution (e.g., 320×240), and resizer 334c may be configured to resize the decoded video stream with a HD resolution (e.g., 1920×1080). Encoder 336a is configured to encode the video stream resized by resizer 334a to output a first output video stream 240a, encoder 336b is configured to encode the video stream resized by resizer 334b to output a second output video stream 240b, and encoder 336c is configured to encode the video stream resized by resizer 334c to output a third output video stream 240c. For example, the first output video stream 240a may be transmitted to second client device 100' via second server 200', the second output video stream 240b may be transmitted to third client device 100" via third server 200", and the third output video stream 240c may be transmitted to first client device 100 via first server 200. However, the disclosure is not limited to these example resolution values and in some implementations the resolution of the video stream received from the first client device 100 may not be modified or resized. The disclosure is also not limited to the example client devices described as receiving the output video streams, and the output video streams may be transmitted to client devices participating in the videoconferencing session other than the example client devices described.

Figure 3:
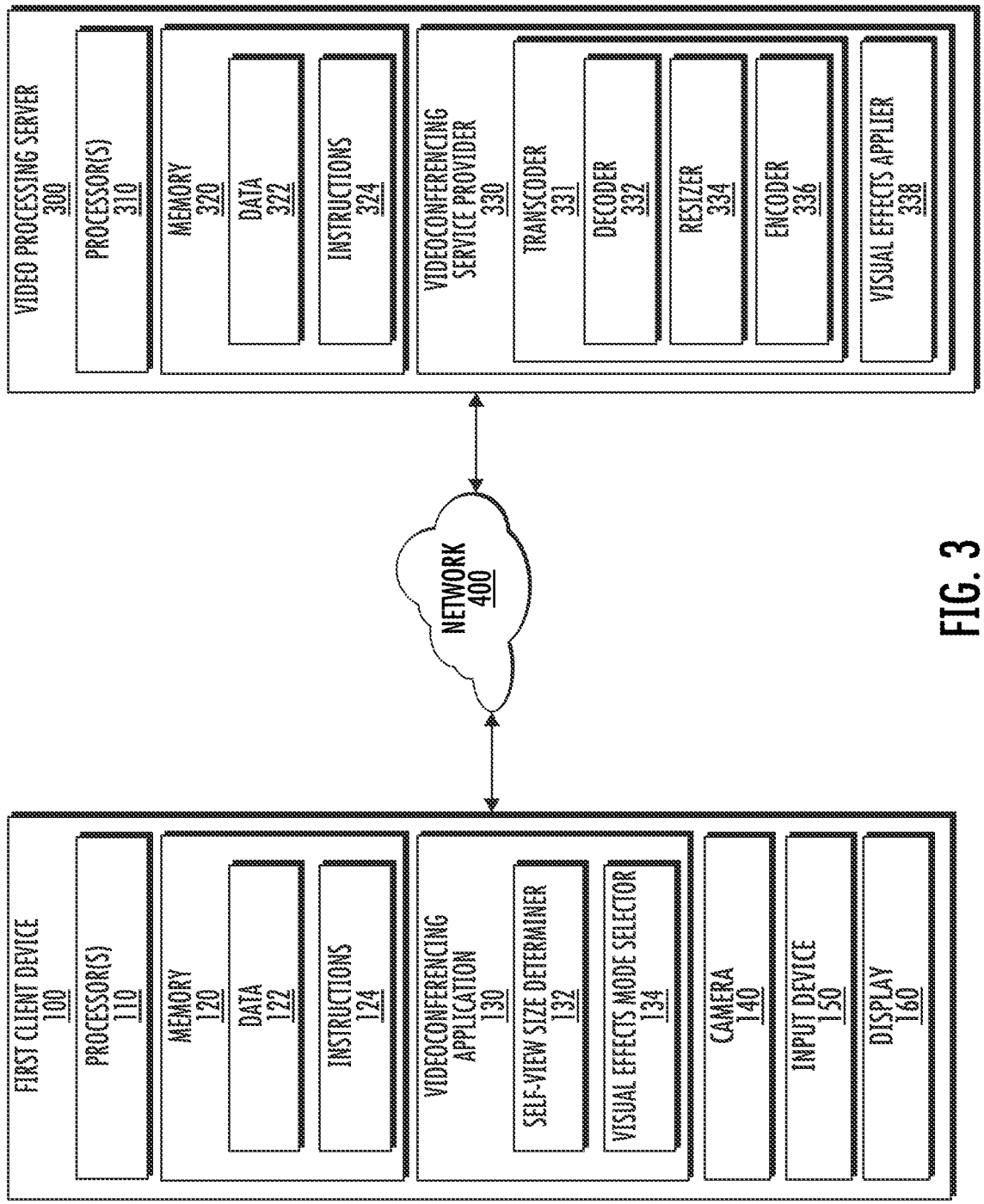
FIG. 3 depicts an example block diagram of a client device and video processing server according to one or more example embodiments of the disclosure.

Referring now to FIG. 3, example block diagrams of a client device and video processing server according to one or more example embodiments of the disclosure will now be described. Although first client device 100 is represented in FIG. 3, features of the first client device 100 described herein are also applicable to the second client device 100' and third client device 100".

The first client device 100 may include one or more processors 110, one or more memory devices 120, a videoconferencing application 130, a camera 140, an input device 150, and a display 160. The video processing server 300 may include one or more processors 310, one or more memory devices 320, and a videoconferencing service provider 330.

For example, the one or more processors 110, 310 can be any suitable processing device that can be included in a first client device 100 or video processing server 300. For example, such a processor 110, 310 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110, 310 can be a single processor or a plurality of processors that are operatively connected, for example in parallel.

The memory 120, 320 can include one or more non-transitory computer-readable storage mediums, such as such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, and combinations thereof. However, examples of the memory 120, 320 are not limited to the above description, and the memory 120, 320 may be realized by other various devices and structures as would be understood by those skilled in the art.

For example, memory 120 can store instructions, that when executed, cause the one or more processors 110 to execute the videoconferencing application 130 with another client device via video processing server 300, as described according to examples of the disclosure. For example, memory 320 can store instructions, that when executed, cause the one or more processors 310 to provide a videoconferencing service for a plurality of client devices, as described according to examples of the disclosure.

Memory 120 can also include data 122 and instructions 124 that can be retrieved, manipulated, created, or stored by the one or more processor(s) 110. In some example embodiments, such data can be accessed and used as input to execute the videoconferencing application 130 with another client device via video processing server 300, as described according to examples of the disclosure. Memory 320 can also include data 322 and instructions 324 that can be retrieved, manipulated, created, or stored by the one or more processor(s) 310. In some example embodiments, such data can be accessed and used as input to provide a videoconferencing service for a plurality of client devices, as described according to examples of the disclosure.

The first client device 100 includes a videoconferencing application 130, which may also be referred to as a video-telephony application or video call application. The videoconferencing application 130 enables a user of the first client device 100 to communicate with a user of another client device via the transmission of audio and visual signals, allowing two or more users to participate in a real-time conversation from different locations in which the two or more users are able to view one another through a video stream. According to examples of the disclosure, the videoconferencing application 130 may include a self-view size determiner 132 and visual effects mode selector 134. Features of the self-view size determiner 132 and visual effects mode selector 134 will be described in more detail below.

The first client device 100 includes a camera 140 from which the videoconferencing application 130 can capture image data and generate a video stream which is transmitted to the video processing server 300. In some example embodiments, the camera 140 collects image data from one or more users of the first client device 100, for example a self-view of the one or more users. The camera 140 can be any device capable of capturing visual data. The first client device 100 is configured to generate a video stream and send the video stream to the video processing server 300 (e.g., via one or more intermediary servers such as first server 200, over network 400). For example, the camera 140 may be an integrated webcam of the first client device 100 or may be a communicatively connected camera device, etc. The first client device 100 can encode the captured video (e.g., as specified by instructions 124, etc.). In some implementations, the first client device 100 can encode the captured video at a high-resolution and a high quality (e.g., in a HD format).

The first client device 100 includes an input device 150 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), a track ball, a remote controller, a portable (e.g., a cellular or smart) phone, a tablet PC, a pedal or footswitch, a virtual-reality device, and so on. The input device 150 may further include a haptic device to provide haptic feedback to a user. The input device 150 may also be embodied by a touch-sensitive display having a touchscreen capability, for example. The input device 150 may be used by a user of the first client device 100 to select one or more visual effects which are to be applied to the video stream generated by the first client device 100. For example, the input device 150 may be used by a user of the first client device 100 to select one or more visual effects which are to be applied to a self-view of the user, such as a lighting effect, a background blurring effect, a background replacement effect, and the like. The input device 150 may be used by a user of the first client device 100 to select default settings with respect to when visual effects are to be applied at the client side versus at the cloud side. For example, a user may specify a default setting that the video processing server 300 is to apply visual effects for a videoconferencing session when the videoconferencing application 130 is initially executed.

The first client device 100 includes a display 160 which displays information viewable by the user. For example, the display 160 may be a non-touch sensitive display or a touch-sensitive display. The display 160 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example displays and may include other types of displays.

In accordance with example embodiments described herein, the video processing server 300 can include one or more processor(s) 310 and memory 320 which were previously discussed above. The video processing server 300 may also include a videoconferencing service provider 330. For example, the videoconferencing service provider 330 may include a transcoder 331 and a visual effects applier 338. The transcoder 331 may be configured to receive compressed media (e.g., video) from the first client device 100, decompress the media, and apply the visual effects to the uncompressed media. To implement the visual effects to the video stream, the transcoder 331 may utilize a library which supports combining visual rendering effects (e.g., blurring, scaling, lighting, etc.) with the execution of foreground segmentation (e.g., in a self-view of the user of the first client device 100, segmenting out the user and applying the visual effects to the background). For example, the transcoder 331 may include one or more decoders 332 to decode the video stream received from the first client device 100, for example as discussed with respect to the embodiments of FIGS. 2A-2B. For example, the transcoder 331 may include one or more resizers 334 to resize the video stream received from the first client device 100, for example as discussed with respect to the embodiments of FIGS. 2A-2B. For example, the transcoder 331 may include one or more encoders 336 to encode each respective video stream which has been resized by a corresponding resizer 334, which is then output to respective client devices participating in the videoconferencing session, for example as discussed with respect to the embodiments of FIGS. 2A-2B.

The visual effects applier 338 is configured to apply one or more visual effects to a video stream received from the first client device 100 based on visual effects information received from the first client device 100. For example, the visual effects information may be received in the form of a configuration property associated with the video stream (e.g., via metadata). The configuration property may include one or more settings for one or more visual effects which are to be applied to the video stream by the video processing server 300. When the first client device 100 requests the video processing server 300 to apply a visual effect to the video stream, the decoder 332 decodes the video stream received from the first client device 100 passes on the decoded video stream to the visual effects applier 338 (also referred to as a media pipe effects module) to apply the visual effect to the video stream to generate a modified video stream.

The video processing server 300 may be a specially configured server, or group of servers, which are dedicated to performing video processing with respect to a video stream received from a client device participating in a videoconferencing session so as to apply visual effects to the video stream. For example, the video processing server 300 may include one or more CPUs, a plurality of GPUs (e.g., to perform segmentation operations and/or to apply the visual effects to the video stream), and a plurality of video encoder accelerators (e.g., ASICs to perform transcoding operations such as encoding, decoding, and resizing).

Additional aspects of the first client device 100 and video processing server 300 will be discussed in view of the following illustrations shown in FIGS. 4-5 and the flow diagrams of FIGS. 6-10.

Figure 4:
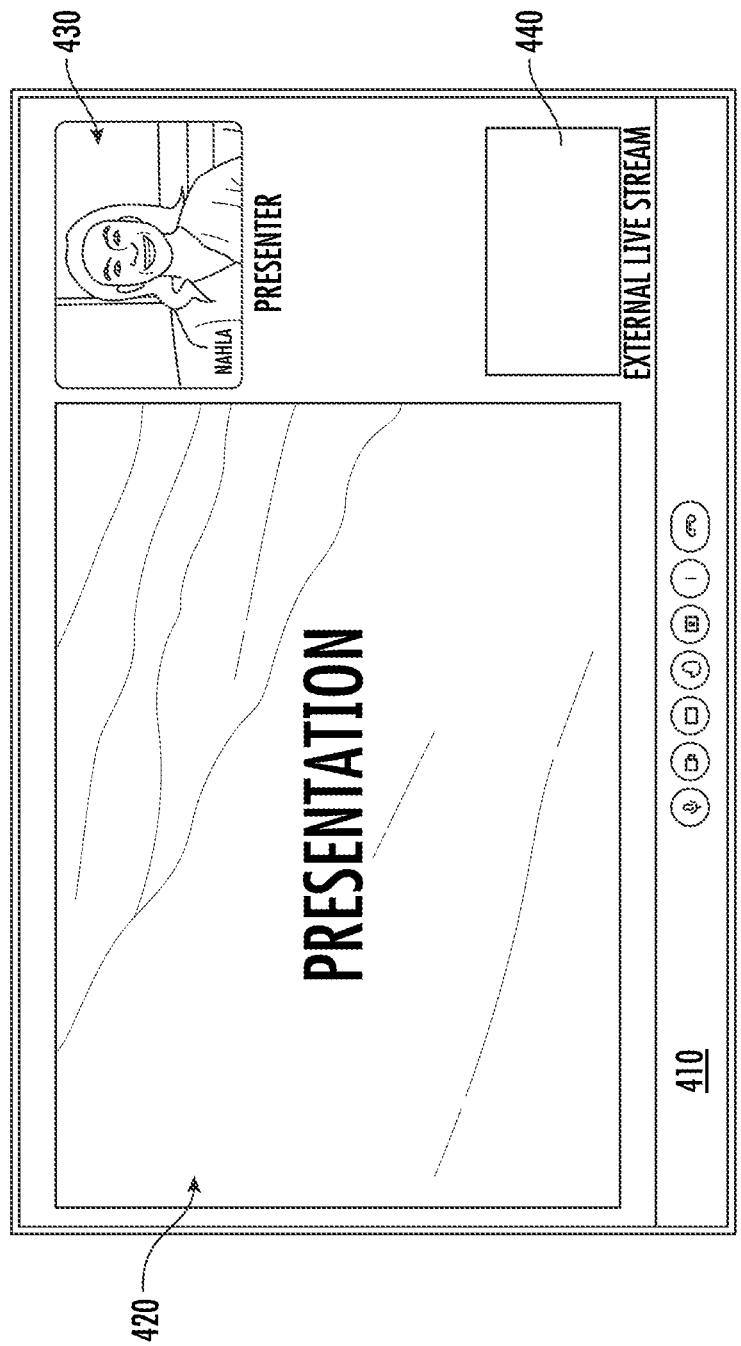
FIG. 4 depicts an example display of a videoconferencing session at a client device, according to one or more example embodiments of the disclosure.

FIG. 4 depicts an example display of a videoconferencing session at a client device, according to one or more example embodiments of the disclosure. Referring to FIG. 4, during a videoconferencing session 410 while executing the videoconferencing application 130 at the first client device 100, the display 160 may display a presentation 420, a self-view 430 of the user of the first client device 100, and one or more external live stream(s) 440 of one or more other users of other client devices participating in the videoconferencing session 410. For example, the first client device 100 may receive one or more video streams from the video processing server 300, first server 200, or another server not specifically shown in the drawings. The locations and/or sizes of each of the presentation 420, self-view 430, and/or external live stream(s) 440 can be varied, for example, according to an input received from the user of the first client device 100. For example, the user of the first client device 100 may change a size of the self-view 430 via input device 150. In addition, one or more of the presentation 420, self-view 430, and one or more external live stream(s) 440 may not be shown at the display 160 of the first client device 100. Also, while FIG. 4 indicates the user of the first client device 100 is the presenter of the presentation 420, the user of the first client device 100 can be any participant in the videoconferencing session 410 and need not be a presenter.

Figure 5:
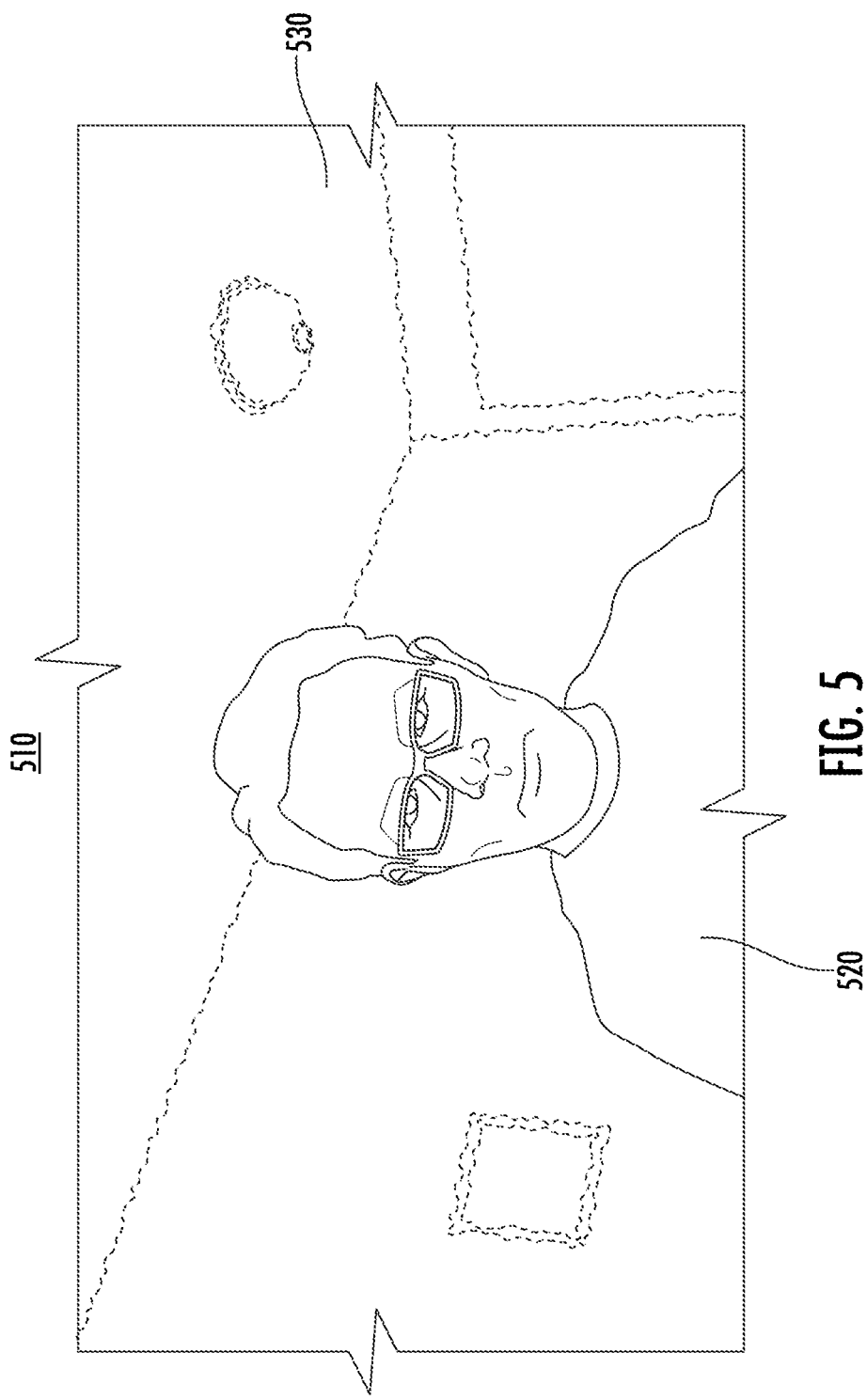
FIG. 5 depicts an example display of a visual effect applied to a self-view of a user in a videoconferencing session at a client device.

FIG. 5 depicts an example display of a visual effect applied to a self-view of a user in a videoconferencing session at a client device, according to one or more example embodiments of the disclosure. Referring to FIG. 5, during a videoconferencing session while executing the videoconferencing application 130 at the first client device 100, the display 160 may display a self-view 510 of the user of the first client device 100 in which the self-view 510 includes user 520 and a blurred background 530. Thus, in the example self-view 510 of FIG. 5 visual effects have been applied to the background of the user 520 causing the background to be blurred, which the user 520 may have selected or requested for privacy reasons, for example. The visual effects may be applied to the background by the first client device 100 or the video processing server 300 according to a mode of operation of the first client device 100, according to a size of the self-view of the user, and various other factors discussed below. The disclosure is not limited to the example embodiment of FIG. 5. For example, visual effects other than, or in addition to, a blurring effect may be applied to the video stream. For example, a lighting effect (e.g., increasing or decreasing a brightness and/or contrast value, etc.), a replacement background, and other visual effects may be applied to the video stream.

FIGS. 6-10 illustrate flow diagrams of example, non-limiting computer-implemented methods according to one or more example embodiments of the disclosure.

Figure 6:
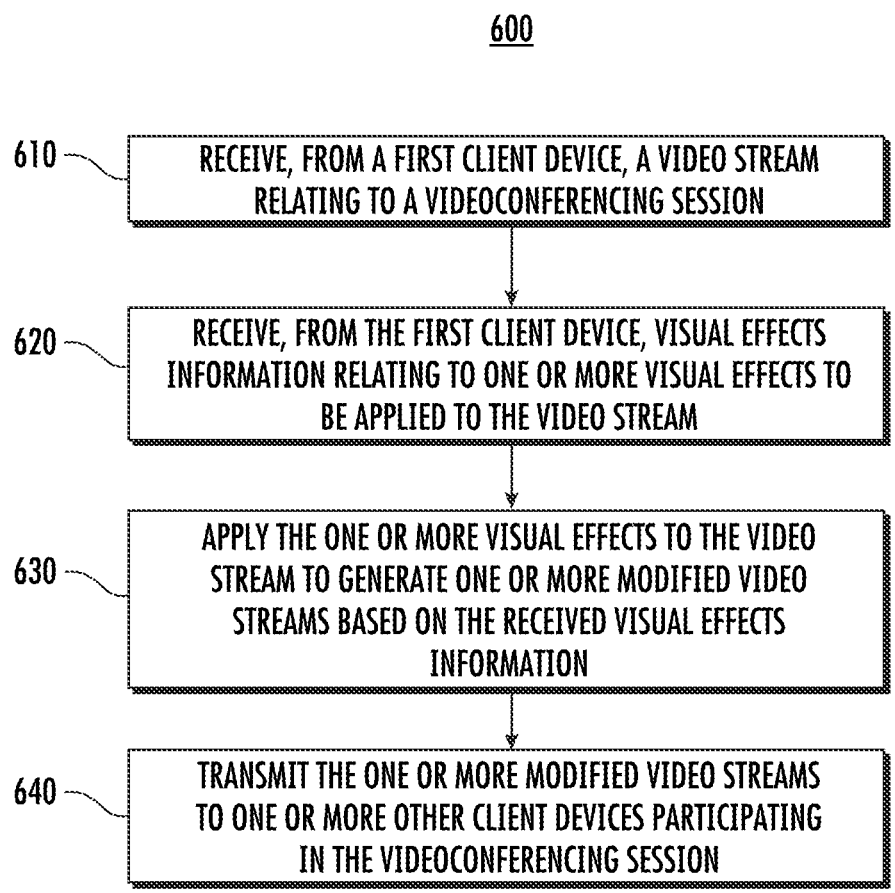
FIGS. 6-10 illustrate flow diagrams of example, non-limiting computer-implemented methods according to one or more example embodiments of the disclosure.

Referring to FIG. 6, the method 600 includes operation 610 of a server system (e.g., the video processing server 300) receiving, from a first client device 100, a video stream relating to a videoconferencing session. The method further includes operation 620 of the server system (e.g., the video processing server 300) receiving, from the first client device 100, visual effects information relating to one or more visual effects to be applied to the video stream. Operation 630 includes the server system (e.g., the video processing server 300) applying the one or more visual effects to the video stream to generate one or more modified video streams (e.g., modified video streams 192, 194) based on the received visual effects information. Operation 640 includes the server system (e.g., the video processing server 300) transmitting the one or more modified video streams to one or more other client devices (e.g., second client device 100' and/or third client device 100") participating in the video conferencing session. Although not shown in FIG. 6, optional operations may include the server system (e.g., the video processing server 300) applying the one or more visual effects to the video stream to generate a modified video streams (e.g., the loopback or modified video stream 196) based on the received visual effects information and transmitting the modified video stream to first client device 100.

With respect to the modified video stream 196 (i.e., the loopback video stream), the first client device 100 may be configured to receive the modified video stream 196 from the video processing server 300 by specifically requesting that the video processing server 300 transmit back the modified video stream 196 to the first client device 100, or the video processing server 300 may be configured to automatically transmit back the modified video stream 196 to the first client device 100. For example, when a visual effect is requested by the first client device 100, the video processing server 300 is configured to signal (e.g., via a message or via metadata) to an intermediary server (e.g., the first server 200) that the video stream received from the first client device 100 will also be used at least in part for a transmission from the video processing server 300 to the first client device 100 via the intermediary server. Accordingly, in response to receiving the signal from the video processing server 300, the intermediary server prepares for sending at least a part of the video stream back to the first client device 100, and a push notification is sent to the first client device 100 to notify the first client device 100 about the new stream. When the first client device 100 receives the notification about the modified stream, the first client device 100 is configured to perform a search of the incoming data from the intermediary server which includes the modified video stream 196. The first client device 100 may be configured to display the modified video stream 196 preferentially over the video stream 190 generated locally at the first client device 100.

In an example embodiment, if the first client device 100 requests the video processing server 300 to apply one or more visual effects to the video stream 190 and the video processing server 300 is unable to modify the video stream 190 (e.g., due to a resource outage or processing limitation), the video processing server 300 may be configured to forward the video stream 190 to other client devices (e.g., second client device 100' and/or third client device 100") in the videoconferencing session without applying the visual effects. However, in an example embodiment the video processing server 300 may also be configured to not forward the video stream 190 to other client devices (e.g., second client device 100' and/or third client device 100") in the videoconferencing session if the video processing server 300 is unable to modify the video stream 190 (e.g., due to a resource outage or processing limitation). The video processing server 300 may receive instructions from the first client device 100 not to forward the video stream 190 to other client devices (e.g., second client device 100' and/or third client device 100") in the videoconferencing session in the event the video processing server 300 is unable to modify the video stream 190 as requested. This aspect provides the user of the first client device 100 with additional privacy in cases that the requested one or more visual effects is privacy-related (e.g., a user may not wish to have other users in the videoconferencing session see an un-blurred background). Thus, other (remote) client devices in the videoconferencing session may receive a modified video stream (with the one or more visual effects applied by the video processing server 300 as requested by the first client device 100) or may receive no video at all from the first client device 100 during intermittent failures of the video processing server 300.

Figure 7:
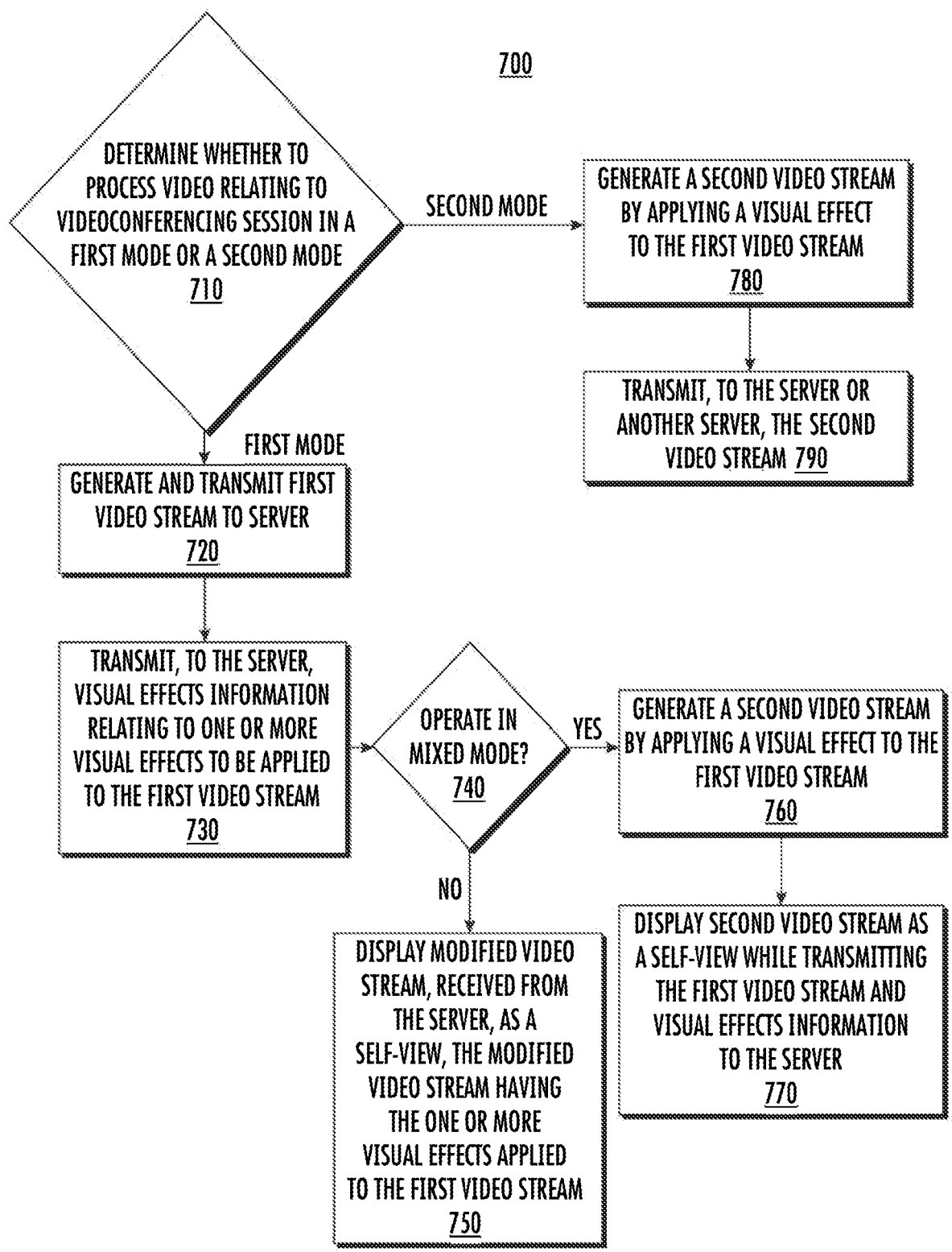

Referring to FIG. 7, the method 700 includes operation 710 of a computing device (e.g., of the first client device 100) determining whether to process video relating to a videoconferencing session in a first mode or a second mode. For example, the first client device 100 may be configured to toggle or switch between a first mode in which the first client device 100 requests that the video processing server 300 apply visual effects to the video stream 190 generated at the first client device 100, and a second mode in which the first client device 100 applies the visual effects to the video stream itself and transmits (e.g., via first server 200) the modified video stream (e.g., incoming video stream 210 in FIG. 2A) to the video processing server 300 which then resizes the modified video stream as needed and outputs the resized modified video stream(s) to one or more other client devices participating in the videoconferencing session. In some instances the first client device 100 may transmit the modified video stream to one or more other client devices participating in the videoconferencing session without the modified video stream passing through the video processing server (e.g., via one or more servers such as any of first server 200, second server 200', third server 200"). In some instances a remote client device which requests a video stream having a highest resolution may receive the modified video stream from the first client device 100 via another server (e.g., any of first server 200, second server 200', third server 200") without the modified video stream passing through the video processing server 300 (as the resizing operation need not be performed by the video processing server 300).

In response to determining to process the video in the first mode, at operation 720 the method includes the computing device (e.g., first client device 100) generating and transmitting a first video stream (e.g., incoming video stream 230) to a server (e.g., video processing server 300), and at operation 730 the method includes the computing device (e.g., first client device 100) transmitting visual effects information (e.g., visual effects information 230') relating to one or more visual effects to be applied to the first video stream by the video processing server 300. (e.g., incoming video stream 230) to a server (e.g., video processing server 300). Here, the first video stream (e.g., incoming video stream 230) corresponds to a raw video stream generated by image data captured by the camera 140, which may correspond to a self-view of the user. Thus, in the first mode the first client device 100 transmits a raw video stream without visual effects to the video processing server 300 and additionally transmits to the video processing server 300 visual effects information relating to one or more visual effects to be applied to the first video stream.

In response to determining to process the video in the second mode, at operation 780 the method includes the computing device (e.g., first client device 100) generating a second video stream (e.g., incoming video stream 210) by the computing device (e.g., first client device 100) applying the one or more visual effects to the first video stream (prior to the first video stream actually being transmitted). At operation 790 the method includes the computing device (e.g., first client device 100) transmitting the second video stream (e.g., incoming video stream 230) to the server (e.g., the video processing server 300) or transmitting the second video stream to another server (e.g., a separate server system which may include any of first server 200, second server 200', third server 200', etc.), thus bypassing the video processing server 300 altogether.

In some implementations the computing device (e.g., first client device 100) may be configured to operate in a mixed mode. For example, the first client device 100 may operate in the mixed mode when the first client device 100 is to switch from the first mode to the second mode where the first client device 100 applies the visual effects to the video stream. If it is decided at operation 740 that the first client device 100 is to operate in the mixed mode (e.g., prior to switching to the second mode), at operation 760 the one or more processors 110 of the first client device 100 are configured to generate the second video stream by the first client device 100 applying the one or more visual effects to the first video stream, and at operation 770 the first client device 100 displays the second video stream as a self-view. At the same time, the first client device 100 transmits the first video stream and visual effects information to the server (e.g., the video processing server 300). That is, the unmodified video stream and visual effects information continue to be sent to the video processing server 300 while the first client device 100 is in the mixed mode, such that the video processing server 300 continues to apply the one or more visual effects to the unmodified video stream and the one or more modified video streams (with visual effects applied by the video processing server 300) are sent for display at remote client devices (e.g., second client device 100' and/or third client device 100") participating in the videoconferencing session. Implementing the mixed mode completely hides the switch from the first mode to the second mode for remote client devices, while for the self-view at the first client device 100 there may be minimal disruptions or glitches when switching to the mixed mode due to the different timelines of the video streams. In an implementation, to avoid operating in the mixed mode for a long period of time, the first client device 100 may be configured to switch from the mixed mode to the second mode after a certain predetermined period of time (e.g., after five minutes). This approach prevents the wasting of cloud resources once the self-view has settled on a size that is below a threshold value such that the first client device 100 can apply visual effects without a degradation of the self-view being too great.

If it is decided at operation 740 that the first client device 100 is not to operate in the mixed mode, at operation 750 the first client device 100 receives a modified video stream (e.g., modified video stream 196) from the server (e.g., video processing server 300) and displays the modified video stream on the display 160 as a self-view. For example, the modified video stream includes the one or more visual effects applied to the first video stream by the server (e.g., video processing server 300).

Figure 8:
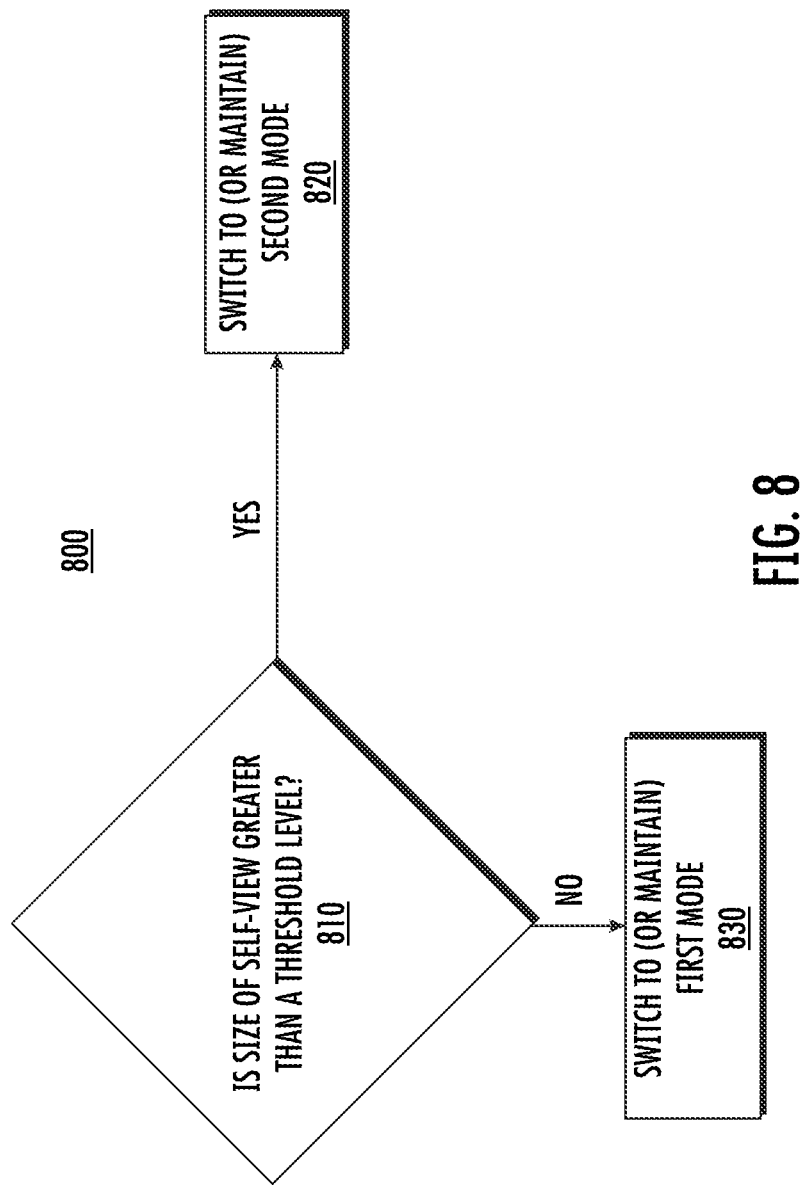

Referring to FIG. 8, the method 800 includes operation 810 of a computing device (e.g., of the first client device 100) determining whether a size of a self-view is greater than a threshold level. For example, the visual effects mode selector 134 may be configured to toggle or switch between the first mode in which the first client device 100 requests that the video processing server 300 applies visual effects to the video stream generated at the first client device 100, and the second mode in which the first client device 100 applies the visual effects to the video stream and transmits the modified video stream to the video processing server 300, based on a size of the self-view and/or the physical resolution of the display of the first client device 100. The size of the self-view may correspond to an active resolution of the self-view and may be determined by the self-view size determiner 132. For example, during a videoconferencing session when the size of the self-view displayed on the display of the client device is greater than a threshold level (value), operation 820 of the computing device (e.g., of the first client device 100) includes the visual effects mode selector 134 determining to switch to (or maintain) the second mode. When the size of the self-view is greater than the threshold level (value), video quality issues may arise at the client device which are perceptible to the user. Conversely, when the size of the self-view displayed on the display of the first client device 100 is less than the threshold level (value), operation 830 of the computing device (e.g., of the first client device 100) includes the visual effects mode selector 134 determining to switch to (or maintain) the first mode.

In some implementations, in response to a media quality of the modified video stream (e.g., the self-view) being less than a threshold level and/or a latency of the modified video stream received from the video processing server 300 being greater than a threshold level, the one or more processors 110 are configured to determine to switch to the second mode and/or stop transmission of the video stream to the video processing server 300. For example, whether the quality of the modified video stream (e.g., the self-view) falls below a threshold value may be determined according to various factors and metrics which relate to quality of service and quality of experience (e.g., whether a resolution of the self-view falls below a threshold level, whether the self-view freezes a certain number of time in a predetermined period of time, whether the self-view freezes for longer than a predetermined period of time, a signal to noise ratio of the self-view, etc.).

In some implementations, in response to a media quality of the modified video stream transmitted to the first client device 100 being less than a threshold level and/or a latency of the modified video stream transmitted to the first client device 100 being greater than a threshold level, the video processing server 300 is configured to transmit a notification to the first client device 100 indicating that the first client device 100 is to assume control for applying the one or more visual effects to the video stream (is to switch to the second mode) and/or the video processing server 300 is to stop transmission of the one or more modified video streams to the one or more other client devices (e.g., second client device 100' and third client device 100") participating in the videoconferencing session.

In an embodiment, during a videoconferencing session when a plurality of self-views are displayed on the display of the first client device 100, the self-view size determiner 132 is configured to determine the self-view having the largest size. The one or more processors 110 of the first client device 100 are configured to determine whether the size of the self-view having the largest size is greater than the threshold level (value) to determine whether to switch to (or maintain) the second mode. The self-view size determiner 132 may be configured to track or monitor a size of the one or more self-views during a videoconferencing session to determine whether a maximum size changes and whether to switch to (or maintain) the second mode. Changes to the size and/or location of the self-view may be transmitted to the video processing server 300 in order to update the location of visual effects which are applied to the self-view, when the first client device is in the first mode. In an example, when the size of the self-view is changed frequently by a user (i.e., changed more than a predetermined number of times within a predetermined time period, such as more than three times within ten seconds), the self-view size determiner 132 may be configured to wait until the resizing has stopped for a predetermined amount of time (e.g., three seconds), before determining the size of the self-view. The one or more processors 110 may subsequently determine whether the size of the self-view displayed on the display of the first client device 100 is greater than the threshold level (value).

Figure 9:
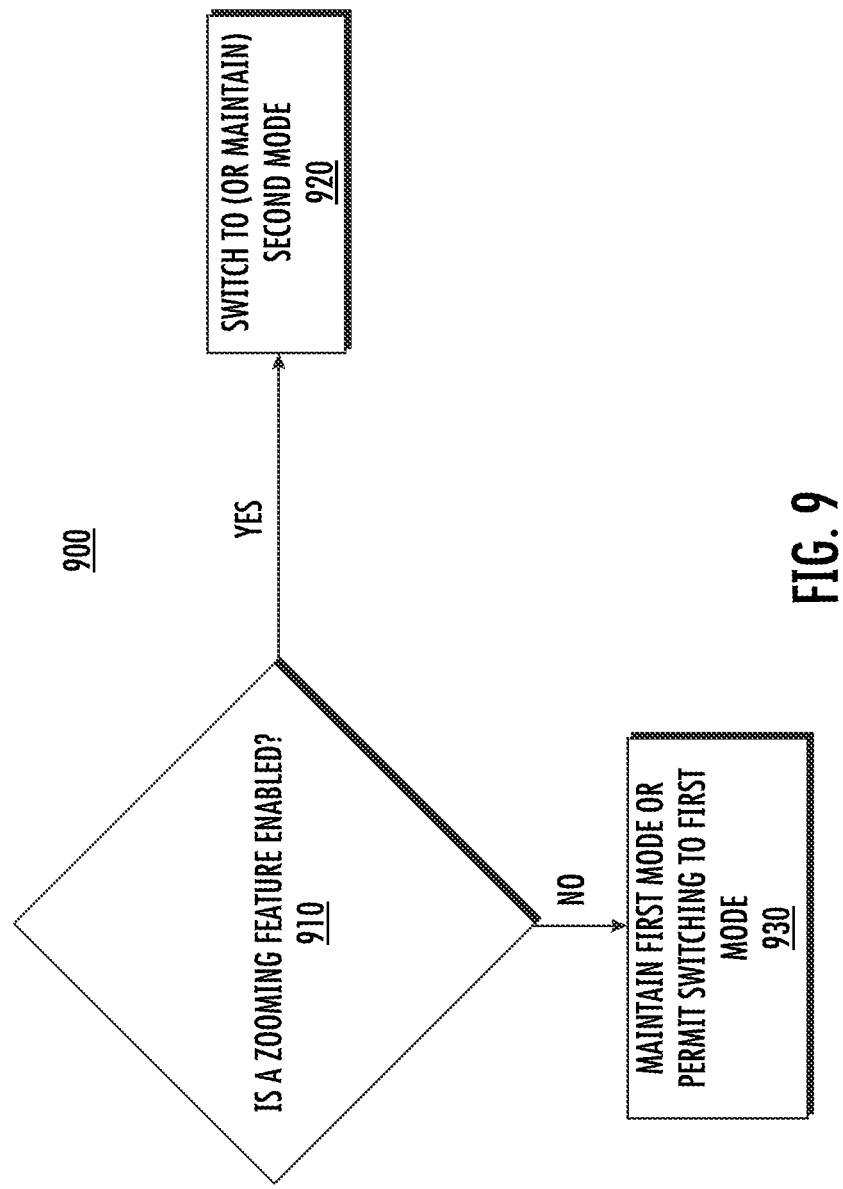

Referring to FIG. 9, the method 900 includes operation 910 of a computing device (e.g., of the first client device 100) determining whether a zooming feature (e.g., an auto-zoom or centering feature) is enabled in the videoconferencing application at the first client device 100. That is, when the one or more processors 110 determine a zooming feature is enabled, operation 920 may include the visual effects mode selector 134 switching to or maintaining the second mode. For example, the video processing server 300 may not be allowed to apply visual effects in the first mode to a zoomed-in video stream because applying visual effects and resizing the zoomed-in video stream may result in a modified video stream which suffers from poor quality (e.g., a loss in resolution). When the one or more processors 110 determine a zooming feature is not enabled, operation 930 may include the visual effects mode selector 134 permitting the first client device 100 to switch to the first mode, or maintaining the first mode.

In an alternative embodiment the video processing server 300 may be configured to apply visual effects to the video stream in the first mode when a zoom feature is enabled in the videoconferencing application at the first client device 100. For example, a zoomed stream (i.e., the raw video stream which is modified at the first client device 100 by zooming) may be sent from the first client device 100 to the video processing server 300, and visual effects may be applied to the zoomed stream. For example, the raw video stream may be sent from the first client device 100 to the video processing server 300, and the video processing server 300 may apply both zooming and visual effects to the video stream.

Figure 10:
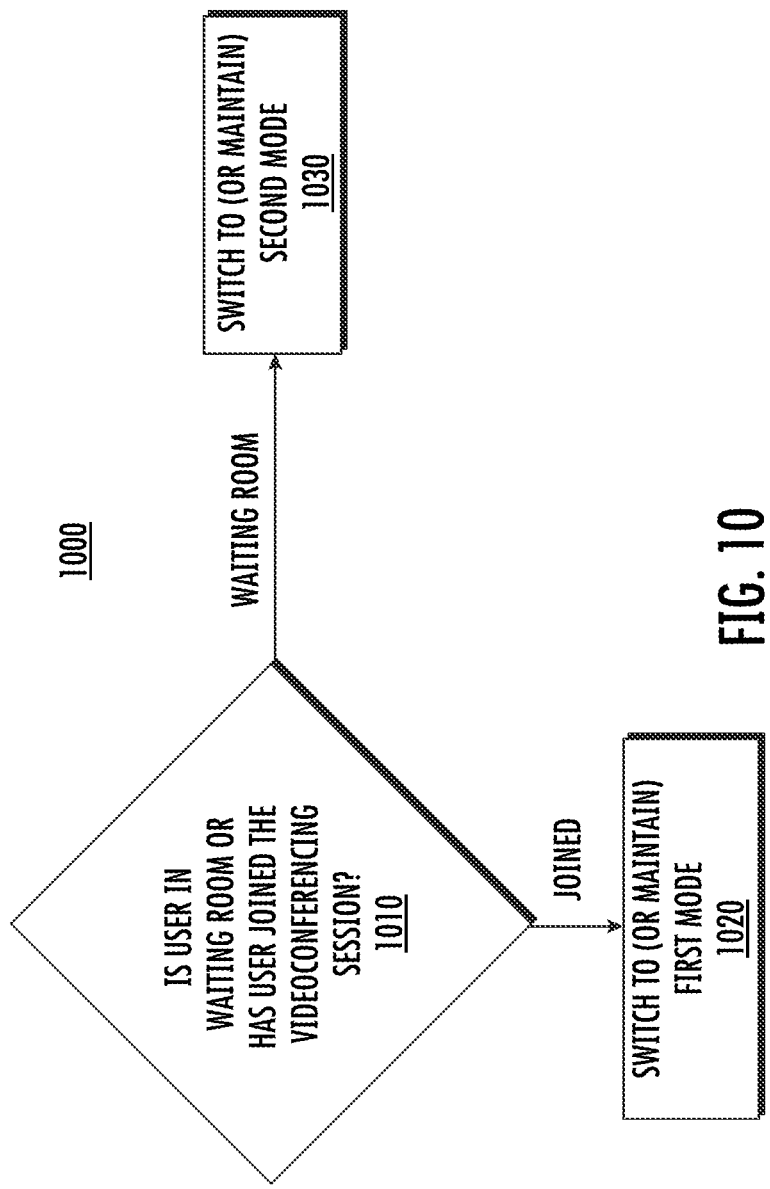

Referring to FIG. 10, the method 1000 includes operation 1010 of a computing device (e.g., of the first client device 100) the one or more processors 110 determining whether a user of the first client device 100 is in a waiting room of the videoconferencing session, or has joined the videoconferencing session. For example, the first client device 100 may be configured to distinguish between a "green room" or "waiting room" state in which a user waits to be admitted or join a meeting in the videoconference session and a "joined" state where the user has been admitted or joined the meeting, when switching between the first and second modes. For example, in some implementations when the first client device 100 is in the waiting state, the video processing server 300 may not support sending and receiving media to the first client device 100 while the first client device 100 remains in the waiting state. For example, in response to the one or more processors 110 determining that the first client device 100 has moved from a waiting room to a joined state, at operation 1020 the visual effects mode selector 134 may be configured to switch from the second mode to the first mode or maintain the first mode. For example, in response to the one or more processors 110 determining that the first client device 100 is in the waiting room, at operation 1030 the visual effects mode selector 134 may be configured to switch from the first mode to the second mode or maintain the second mode. For example, a background blur effect (or other visual effect) which is applied by the first client device 100 to the video stream while the first client device 100 waits in a waiting room to be admitted to a meeting "moves" from the first client device 100 to the video processing server 300 in response to the first client device 100 being admitted to the meeting in the videoconferencing session. Thus, when the first client device 100 joins the meeting the video processing server 300 assumes responsibility for applying the background blur effect (or other visual effect) to the video stream. In an alternative embodiment the video processing server 300 may support sending and receiving media to the first client device 100 while the first client device 100 is in the waiting state and thus the operations of FIG. 10 may not be performed.

When the first client device 100 toggles or switches between the first mode and the second mode, intermittent video issues (e.g., freezing of video, frame drops, etc.) may occur. Such intermittent video issues may be more apparent in the self-view than by remote participants of the videoconferencing session. Example embodiments described below provide additional methods for avoiding or mitigating these video issues which occur when switching between the first and second modes. For example, when switching from the first mode to the second mode (or vice versa) the first client device 100 may be configured to wait until the second mode (or first mode) has started before shutting down the previous implementation. For example, when switching from the second mode to the first mode, the first client device 100 starts receiving remote frames for the self-view generated by the video processing server 300 before the first client device 100 stops applying visual effects to the video stream sent to the video processing server 300. This may result in some frames of the video stream(s) received by the first client device 100 and remote client devices (e.g., second client device 100' and third client device 100") having visual effects being doubly applied to the self-view of the user of the first client device 100. For example, when switching from the first mode to the second mode, the first client device 100 starts generating and displaying frames for the self-view with visual effects applied to the video stream by the first client device 100 before the video processing server 300 stops applying visual effects to the video stream sent to the video processing server 300 and looped back to the first client device 100. This may also result in some frames of the video stream(s) received by the first client device 100 and remote client devices having visual effects being doubly applied to the self-view of the user of the first client device 100.

For example, if the first client device 100 is to switch to the first mode in which a background blur is to be applied to the video stream by the video processing server 300 while a background replace visual effect is being applied to the video stream, the visual effects mode selector 134 of the first client device 100 may be configured to temporarily operate in a hybrid or mixed mode by which the background blur is applied to the video stream by the video processing server 300 while also still allowing the background replace visual effect to be applied to the video stream by the first client device 100 for a predetermined period of time (or until a first keyframe of the remote modified video stream generated by the video processing server 300 having the background blur applied to the video stream is received by the first client device 100). After the expiration of the predetermined period of time (or after the first keyframe is received), the visual effects mode selector 134 is configured to disable the background replace visual effect being applied by the first client device 100 such that the first client device 100 operates in the first mode. Thus, a few frames of the video stream may contain both visual effects for a short time, however such an approach ensures no unprocessed frames will be forward to other remote client devices (e.g., second client device 100' and third client device 100") participating in the videoconferencing session.

In an example embodiment, when switching from the second mode to the first mode, the one or more processors 110 of the first client device 100 may be configured to keep displaying the self-view of the user of the first client device 100 via a local stream until a first keyframe of the remote modified video stream has been received from the video processing server 300. This approach may result in no freezing and a minimal amount of frames with effects doubly applied (e.g., double-blur due to visual effects being applied by both the first client device 100 and video processing server 300). If the video stream is not already being resized for multiple resolutions, remote views at other client devices (e.g., second client device 100' and third client device 100") in the videoconferencing session may temporarily freeze when visual effects are requested by the first client device 100 to be applied by the video processing server 300 and unfreeze once the first keyframe from the first client device 100 through the video processing server 300 has been propagated to the other client devices. The first client device 100 will continue to apply visual effects until it receives the new modified video stream from the video processing server 300. Thus, the first client device 100 will receive some frames with effects doubly applied. In another example, to make the switch from the second mode to the first mode on the self-view faster, a view request for a self-view may be limited to a threshold resolution (e.g., 640×360).

For example, when switching from the first mode to the second mode, the one or more processors 110 of the first client device 100 may be configured to display the self-view using the local stream immediately once visual effects are applied by the first client device 100, hiding any artifacts. Remote views at other client devices (e.g., second client device 100' and third client device 100") in the videoconferencing session may display some frames with effects doubly applied (e.g., having double-blur) until the disabling of the visual effects by the video processing server 300 takes effect and some stalling/frame drops while the first client device 100 is loading the visual effects.

In some implementations, to reduce a freeze time and/or reduce or avoid frames with double-effects, other configurations at the first client device 100 and/or video processing server 300 may be implemented. For example, the video processing server 300 may be kept in a state (e.g., a ready state) that is ready for applying visual effects to the video stream transmitted from the first client device 100, but does not actually apply any visual effects until the mode is switched to the first mode. Keeping the video processing server 300 in the state ready for applying visual effects reduces a startup time for the video processing server 300 and reduces a freeze time for remote client devices (e.g., second client device 100' and third client device 100") in the videoconferencing session. In an embodiment the first client device 100 may be configured to send a timestamp/frame counter to the video processing server 300 indicating a time in the future when the first client device 100 wants to switch modes. The video processing server 300 may be configured to ensure that the visual effect is enabled/disabled from that frame at the appropriate time. The first client device 100 may be configured to wait until the timestamp/frame counter value before starting/stopping the application of the visual effect, preventing double-effect frames. The video processing server 300 may be configured to immediately switch modes and/or may be kept in the ready state according to this embodiment in which the first client device 100 sends the timestamp/frame counter.

In an embodiment the first client device 100 may be configured to send metadata on the frames of the video stream which provide information to the video processing server 300 about the visual effects. When the first client device 100 requests the video processing server 300 to apply the visual effects, the video processing server 300 is configured to generate the modified video stream having the visual effects only if the applied visual effects are different from any visual effects which are applied to the incoming video stream. The video processing server 300 may be configured to immediately switch modes and/or may be kept in the ready state according to this embodiment in which the first client device 100 sends metadata on the frames of the video stream which provide information to the video processing server 300 about the visual effects.

For example, in some implementations the first client device 100 and/or video processing server 300 may pre-load a visual effect without actually applying the visual effect to the output stream. When switching from the first mode to the second mode, for example, the first client device 100 may be configured to pre-load a visual effect, request the video processing server 300 to freeze at a current frame having visual effects which have been applied by the video processing server 300, send the video stream having visual effects applied by the first client device 100, and then request the video processing server 300 to stop applying visual effects to the video stream. Thus, instead of frames with double-effects, a short video freeze is applied. When switching from the second mode to the first mode, for example, the video processing server 300 may be configured to pre-load a visual effect and receive a request from the first client device 100 to freeze a frame having visual effects applied by the first client device 100. The first client device 100 may stop applying visual effects to the video stream and send a video stream without visual effects to the video processing server 300. The video processing server 300 is then requested to apply visual effects to the video stream. Thus, instead of frames with double-effects, a short video freeze is applied.

In some implementations, the videoconferencing application 130 may have a default setting for the first client device 100 to operate in the first mode. That is, the videoconferencing application 130 may prefer as a default that the video processing server 300 apply the visual effects in the first mode during a videoconferencing session (instead of the first client device 100 applying visual effects to the video stream in the second mode). In response to the video processing server 300 not being available (e.g., due to a resource outage, high peak usage, bandwidth limitations, etc.), the visual effects mode selector 134 may be configured to switch to the second mode by which processing of the visual effects is applied by the first client device 100. For example, in response to the video processing server 300 running out of graphic computing resources, the video processing server 300 notifies the first client device 100 (e.g., via first server 200) via a message, via metadata, and the like, that that the first mode has become unavailable, and the visual effects mode selector 134 will switch to the second mode in which the first client device 100 applies the visual effects (i.e., client-side effects). In an example embodiment, if the first client device 100 is unable to support the visual effects which were requested to be applied to the video stream, the one or more processors 110 of the first client device 100 may be configured to control the display 160 of the first client device 100 to display a message indicating that the requested visual effects could not be applied to the video stream, and the camera 140 of the first client device 100 may be muted to protect user privacy. In addition, or as an alternative, if the first client device 100 is unable to support the visual effects which were requested to be applied to the video stream, the one or more processors 110 of the first client device 100 may be configured to stop transmitting the video stream. The first client device 100 may notify the user by additional or alternative methods (e.g., via a speaker) that the requested visual effects could not be applied to the video stream.

In some implementations, the first client device 100 may be configured to display a self-view of the user of the first client device 100 during the videoconferencing session, where the self-view can be generated and displayed locally by the first client device 100, or the self-view can correspond to a video stream that has been modified by the video processing server 300 applying one or more visual effects to the video stream and looping back the modified video stream to the first client device 100 for display as the self-view of the user. For example, when the first client device 100 operates in the first mode and requests that the video processing server 300 apply visual effects to the video stream, the first client device 100 may be configured to receive—remotely—the modified video stream. The remotely received modified video stream may have worse quality and latency than a local self-view that is generated by the first client device 100 because of the network round trip and transcoding which takes place at the video processing server 300. However, according to example embodiments disclosed herein, the quality and latency of the self-view may be improved according to various techniques. Thus, the media quality and latency of the self-view may be kept at a level where the user's perception of the quality of the videoconferencing session is not negatively affected. For example, to obtain a lower latency (e.g., a threshold less than one second, a threshold less than 300 ms, etc.), the video processing server 300 may be configured to enable WebRTC low-latency rendering and set a threshold limit for the latency when sending the modified video stream back to the first client device 100 (e.g., by setting the threshold limit in a PlayoutDelayLimits RTP header extension). As an additional, or alternative, approach to improve self-view quality, the video processing server 300 may be configured to adjust a bitrate allocation strategy so as to prioritize the modified video stream to be sent back to the first client device 100 relative to sending modified video streams to other client devices (e.g., second client device 100' and third client device 100"). That is, the video processing server 300 may be configured to prioritize the looped-back modified video stream 196 when distributing available bandwidth to the downstreams. Without this prioritization, a user of the first client device 100 may lose their self-view in larger meetings when not speaking, while others in the videoconferencing session may still view the user. As an additional, or alternative, approach to improve self-view quality, the one or more processors 110 of the first client device 100 may be configured to reduce the framerate for remotely received video streams (e.g., video streams transmitted from other client devices in the videoconferencing session such as second client device 100' and third client device 100") as a performance adaptation, where the self-view modified video stream is excluded (i.e., kept at a default framerate). If there still is not enough bandwidth for the looped-back modified video stream 196, in spite of one or more of the above-described techniques being implemented (e.g., by increasing a priority of the modified video stream to be sent back to the first client device 100), the one or more processors 110 of the first client device 100 may be configured to detect that the video processing server 300 and/or first server 200 are unable to modify the video stream 190 generated by the first client device 100 with visual effects, and the visual effects mode selector 134 may switch from processing the video in the first mode to processing the video in the second mode where the first client device 100 modifies the video stream by applying visual effects to the video stream and generates its own self-view.

Terms such as "module", and "unit," may be used herein in association with various features of the disclosure. Such terms may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Aspects of the above-described example embodiments may be recorded in computer-readable media (e.g., non-transitory computer-readable media) including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

While the disclosure has been described with respect to various example embodiments, each example is provided by way of explanation, not limitation of the disclosure. Those skilled in the art, upon attaining an understanding of the foregoing, can readily produce alterations to, variations of, and equivalents to such embodiments. Accordingly, the disclosure does not preclude inclusion of such modifications, variations and/or additions to the disclosed subject matter as would be readily apparent to one of ordinary skill in the art. For example, features illustrated or described as part of one embodiment can be used with another embodiment to yield a still further embodiment. Thus, it is intended that the disclosure covers such alterations, variations, and equivalents.

What is claimed is:

1. A server system, comprising:
   one or more memories configured to store instructions; and
   one or more processors configured to execute the instructions stored in the one or more memories to:
      receive, from a first client device, a video stream relating to a videoconferencing session,
      receive, from the first client device, visual effects information relating to one or more visual effects to be applied to the video stream,
      apply, based on the visual effects information received from the first client device, the one or more visual effects to the video stream received from the first client device to generate one or more modified video streams, and
      transmit the one or more modified video streams generated at the server system to the first client device and one or more other client devices participating in the videoconferencing session.

2. The server system of claim 1, wherein the one or more processors are configured to, in response to a media quality of the modified video stream transmitted to the first client device being less than a threshold level:
   transmit a notification to the first client device indicating that the first client device is to assume control for applying the one or more visual effects to the video stream, or
   stop transmission of the one or more modified video streams to the one or more other client devices participating in the videoconferencing session, or
   transmit the notification to the first client device indicating that the first client device is to assume control for applying the one or more visual effects to the video stream and stop transmission of the one or more modified video streams to the one or more other client devices participating in the videoconferencing session.

3. The server system of claim 1, wherein the one or more processors are configured to, in response to a latency of the modified video stream transmitted to the first client device being greater than a threshold level,
   transmit a notification to the first client device indicating that the first client device is to assume control for applying the one or more visual effects to the video stream, or
   stop transmission of the one or more modified video streams to the one or more other client devices participating in the videoconferencing session, or
   transmit the notification to the first client device indicating that the first client device is to assume control for applying the one or more visual effects to the video stream and stop transmission of the one or more modified video streams to the one or more other client devices participating in the videoconferencing session.

4. The server system of claim 1, wherein the one or more processors are configured to:
   generate a plurality of modified video streams based on the visual effects information received from the first client device, wherein each of the plurality of modified video streams have a different resolution, and
   transmit one of the plurality of modified video streams to a respective client device among the one or more other client devices participating in the videoconferencing session based on a data transfer rate between the server system and the respective client device.

5. The server system of claim 1, wherein the visual effects information includes information relating to one or more settings for the one or more visual effects to be applied to the video stream.

6. The server system of claim 5, wherein the one or more settings include a blur radius for a background blur effect to be applied to at least a portion of the video stream.

7. The server system of claim 5, wherein the one or more settings include a brightness level for a lighting effect to be applied to at least a portion of the video stream.

8. The server system of claim 1, wherein the video stream transmitted from the first client device is a self-view of a user of the first client device.

9. The server system of claim 8, wherein, in response to the self-view of the user being changed to a size greater than a threshold level, the one or more processors are configured to:
   stop applying the one or more visual effects to the video stream, and
   transmit a notification to the first client device indicating that the first client device is to assume control for applying the one or more visual effects to the video stream and/or to stop transmission of the one or more modified video streams to the one or more other client devices participating in the videoconferencing session.

10. A computing device, comprising:
one or more memories configured to store instructions; and
one or more processors configured to execute the instructions stored in the one or more memories to:
determine whether to process video relating to a videoconferencing session in a first mode or a second mode,
in response to determining to process the video in the first mode, generate a first video stream and transmit, to a server system, the first video stream and transmit, to the server system, visual effects information relating to one or more visual effects to be applied to the first video stream, and
in response to determining to process the video in the second mode, generate a second video stream by applying the one or more visual effects to the first video stream and transmit, to the server system, the second video stream,
wherein in response to determining to process the video in the first mode, the one or more processors are configured to receive, from the server system, a modified video stream in which the one or more visual effects have been applied to the first video stream by the server system based on the visual effects information transmitted to the server system from the computing device.

11. The computing device of claim 10, wherein the one or more processors are configured to, in response to a media quality of the modified video stream received from the server system being less than a threshold level, determine to:
process the video in the second mode, or
stop transmission of the first video stream to the server system, or
process the video in the second mode and stop transmission of the first video stream to the server system.

12. The computing device of claim 11, wherein the one or more processors are configured to, in response to a latency of the modified video stream received from the server system being greater than a threshold level, determine to:
process the video in the second mode, or
stop transmission of the first video stream to the server system, or
process the video in the second mode and stop transmission of the first video stream to the server system.

13. The computing device of claim 10, wherein the visual effects information includes information relating to one or more settings for a visual effect to be applied to the first video stream.

14. The computing device of claim 13, wherein the one or more settings include a blur radius for a background blur effect to be applied to at least a portion of the first video stream.

15. The computing device of claim 13, wherein the one or more settings include a brightness level for a lighting effect to be applied to at least a portion of the first video stream.

16. The computing device of claim 10, wherein
the video includes a self-view of a user of the computing device, and
the one or more processors are configured to determine whether to process the video in the first mode or the second mode based on a size of the self-view.

17. The computing device of claim 16, wherein
when the size of the self-view is less than a threshold level, the one or more processors are configured to determine to process the video in the first mode, and
when the size of the self-view is greater than the threshold level, the one or more processors are configured to determine to process the video in the second mode.

18. The computing device of claim 10, wherein
the video includes a plurality of self-views of a user of the computing device,
the one or more processors are configured to determine a self-view among the plurality of self-views having a largest size, and
the one or more processors are configured to determine whether to process the video in the first mode or the second mode based on a size of the self-view having the largest size.

19. The computing device of claim 10, wherein the visual effects information includes instructions for the server system to not transmit the first video stream to other client devices participating in the videoconferencing session if the one or more visual effects cannot be applied to the first video stream.

20. A computer implemented method, comprising:
determining, by a computing device comprising one or more processors, whether to process video relating to a videoconferencing session in a first mode or a second mode;
in response to determining to process the video in the first mode, the computing device generating a first video stream and transmitting, to a server system, the first video stream and the computing device transmitting, to the server system, visual effects information relating to one or more visual effects to be applied to the first video stream; and
in response to determining to process the video in the second mode, the computing device generating a second video stream by applying the one or more visual effects to the first video stream and the computing device transmitting, to the server system, the second video stream,
wherein in response to determining to process the video in the first mode, the method further comprises the computing device receiving, from the server system, a modified video stream in which the one or more visual effects have been applied by the server system to the first video stream based on the visual effects information transmitted to the server system from the computing device.

* * * * *